US012011872B2

United States Patent
Sajadi et al.

(10) Patent No.: US 12,011,872 B2
(45) Date of Patent: Jun. 18, 2024

(54) ADDITIVE MANUFACTURE-ASSISTED METHOD FOR MAKING STRUCTURAL ELEMENTS HAVING CONTROLLED FAILURE CHARACTERISTICS

(71) Applicants: SAUDI ARABIAN OIL COMPANY, Dhahran (SA); WILLIAM MARSH RICE UNIVERSITY, Houston, TX (US)

(72) Inventors: Seyed Mohammad Sajadi, Houston, TX (US); Ashok Kumar Meiyazhagan, Houston, TX (US); Peter Boul, Houston, TX (US); Muhammad Rahman, Houston, TX (US); Carl Thaemlitz, Houston, TX (US); Pulickel Ajayan, Houston, TX (US)

(73) Assignees: Saudi Arabian Oil Company, Dhahran (SA); William Marsh Rice University, Houston, TX (US)

( * ) Notice: Subject to any disclaimer, the term of this patent is extended or adjusted under 35 U.S.C. 154(b) by 0 days.

(21) Appl. No.: 18/337,876

(22) Filed: Jun. 20, 2023

(65) Prior Publication Data

US 2023/0330923 A1    Oct. 19, 2023

Related U.S. Application Data

(62) Division of application No. 16/874,449, filed on May 14, 2020, now Pat. No. 11,724,443.

(51) Int. Cl.
B29C 64/118 (2017.01)
B32B 13/12 (2006.01)
(Continued)

(52) U.S. Cl.
CPC ............ B29C 64/118 (2017.08); B32B 13/12 (2013.01); B32B 27/306 (2013.01); B33Y 10/00 (2014.12);
(Continued)

(58) Field of Classification Search
CPC ..... B29C 64/118; B29C 64/106; B32B 13/12; B32B 27/306; B32B 2307/202;
(Continued)

(56) References Cited

U.S. PATENT DOCUMENTS 7,455,805 B2   11/2008   Oriakhi et al.
9,388,078 B2   7/2016    Rael
(Continued)

FOREIGN PATENT DOCUMENTS

CN   107901185 A   4/2018
DE   29916239 U1   12/1999
(Continued)

OTHER PUBLICATIONS

Asprone et al., "3D Printing of Reinforced Concrete Elements: Technology and Design Approach," Construction and Building Materials, vol. 165, pp. 218-231, Mar. 20, 2018.
(Continued)

Primary Examiner — Brian Handville
(74) Attorney, Agent, or Firm — Bracewell LLP; Constance G. Rhebergen; Eleanor T. Porter

(57) ABSTRACT

A process for making a layered multi-material structural element having controlled mechanical failure characteristics. The process includes the steps of: supplying a cementitious layer and forming a polymer layer on the cementitious layer by additive manufacture such that the polymer layer has a first thickness and the cementitious layer has a second thickness, wherein the polymer layer comprises a polymer and the cementitious layer comprises a cementi-
(Continued)

tious material; and allowing the polymer from the polymer layer to suffuse into the cementitious layer for a period of time to obtain a suffused zone in the cementitious layer such that the suffused zone has a third thickness that is less than half the second thickness.

3 Claims, 17 Drawing Sheets

(51) Int. Cl.

| | |
|---|---|
| *B32B 27/30* | (2006.01) |
| *B33Y 10/00* | (2015.01) |
| *B33Y 30/00* | (2015.01) |
| *B33Y 70/10* | (2020.01) |
| *B33Y 80/00* | (2015.01) |
| *E21B 47/005* | (2012.01) |
| *B29K 29/00* | (2006.01) |
| *B29K 105/00* | (2006.01) |
| *C04B 7/02* | (2006.01) |

(52) U.S. Cl.
CPC ............... *B33Y 30/00* (2014.12); *B33Y 70/10* (2020.01); *B33Y 80/00* (2014.12); *E21B 47/005* (2020.05); *B29K 2029/04* (2013.01); *B29K 2105/0079* (2013.01); *B32B 2307/202* (2013.01); *B32B 2315/06* (2013.01); *C04B 7/02* (2013.01); *E21B 2200/01* (2020.05)

(58) Field of Classification Search
CPC ..... B32B 2315/06; B33Y 10/00; B33Y 30/00; B33Y 70/10; B33Y 80/00; B33Y 70/00; E21B 47/005; E21B 2200/01; B29K 2029/04; B29K 2105/0079; C04B 7/02; C04B 26/02; C04B 41/009; C04B 41/48; C04B 2111/00181; C04B 2111/00612; C04B 28/02; C04B 14/026; C04B 14/34; C04B 14/386; C04B 16/0675; C04B 40/0263; B28B 7/342; B28B 1/001; B28B 7/346; B28B 7/348; B28B 23/02; B29L 2031/757; C09K 8/42
See application file for complete search history.

(56) References Cited

U.S. PATENT DOCUMENTS

| | | |
|---|---|---|
| 9,902,108 B1 | 2/2018 | Wurmfeld |
| 2007/0138678 A1 | 6/2007 | Khoshnevis |
| 2008/0029685 A1 | 2/2008 | West |
| 2014/0291886 A1 | 10/2014 | Mark et al. |
| 2015/0001761 A1 | 1/2015 | Bratton et al. |
| 2016/0001461 A1 | 1/2016 | Gardiner et al. |
| 2016/0136891 A1 | 5/2016 | Benthien et al. |
| 2016/0137839 A1* | 5/2016 | Rolland ............... C08F 220/34 522/71 |
| 2016/0243721 A1 | 8/2016 | Tew |
| 2016/0264461 A1 | 9/2016 | Peng et al. |
| 2016/0362959 A1 | 12/2016 | Zhou |
| 2017/0054191 A1 | 2/2017 | Williams |
| 2018/0079134 A1 | 3/2018 | Tomko et al. |
| 2019/0099945 A1 | 4/2019 | Hsing et al. |
| 2019/0112517 A1 | 4/2019 | Dahi Taleghani et al. |
| 2019/0135707 A1 | 5/2019 | Krasnoff et al. |

FOREIGN PATENT DOCUMENTS

| | | |
|---|---|---|
| EP | 1491516 B1 | 7/2011 |
| JP | H1086117 A | 4/1998 |
| JP | 2000094553 A | 4/2000 |
| JP | 3734186 B2 | 1/2006 |
| JP | 4914974 B2 | 4/2012 |
| KR | 20170120762 A | 11/2017 |
| RU | 2662838 C1 | 7/2018 |
| WO | 9841707 A1 | 9/1998 |
| WO | 2009030802 A2 | 3/2009 |
| WO | 2018136475 A1 | 7/2018 |
| WO | 2019112893 A1 | 6/2019 |
| WO | 2019168621 A1 | 9/2019 |

OTHER PUBLICATIONS

Gibbons et al., "3D Printing of Cement Composites", University of Warwick, 2010, pp. 1-8 Gibbons et al., "3D Printing of Cement Composites", University of Warwick, 2010, pp. 1-8.

Hilal, et al., "On Void Structure and Strength of Foamed Concrete Made Without/With Additives," Construction and Building Materials, vol. 85, pp. 157-164, Jun. 15, 2015.

Invitation to Pay Additional Fees and Partial International Search Report of PCT Application No. PCT/US2021/070554 dated Aug. 6, 2021: pp. 1-12.

Sajadi et al., "Direct Ink Writing of Cement Structures Modified with Nanoscale Additive", Advanced Engineering Materials, 2019, pp. 1-10.

* cited by examiner

A) B) C)

A) B) C)

ADDITIVE MANUFACTURE-ASSISTED METHOD FOR MAKING STRUCTURAL ELEMENTS HAVING CONTROLLED FAILURE CHARACTERISTICS

PRIORITY

The present application is a divisional application of U.S. patent application Ser. No. 16/874,449, filed on May 14, 2020, the entire disclosure of which is incorporated here by reference.

TECHNICAL FIELD

The field of invention relates to multipurpose structural elements. More specifically, the field relates to the manufacture of multifaceted cement structural elements.

BACKGROUND

Cement is commonly used throughout the world as a building material because of its favorable compressive strength properties and widespread availability. However, conventional cement casting techniques, which generally involve pouring cement into simple molds or forms, limit applications to relatively simple geometric shapes.

Recently, additive manufacturing techniques have enabled the manufacture of more complex cement structures by direct printing (that is, selectively adding small amounts of material layer by layer). However, direct printing with cement requires specially formulated cement compositions that contain additives to cause the cement to gel quickly. Moreover, conventional structures made of cement are brittle and susceptible to catastrophic failure because cement has a relatively high Young's modulus, which results in limited fracture strain and toughness of the cement material.

SUMMARY

Methods of making structural elements having controlled mechanical failure characteristics and structural elements having improved mechanical properties are disclosed.

In a first aspect, a process for making a layered multi-material structural element having controlled mechanical failure characteristics is provided. The process includes the steps of: supplying a cementitious layer and forming a polymer layer on the cementitious layer by additive manufacture such that the polymer layer has a first thickness and the cementitious layer has a second thickness; wherein the polymer layer comprises a polymer and the cementitious layer comprises a cementitious material; and allowing the polymer from the polymer layer to suffuse into the cementitious layer for a period of time to obtain a suffused zone in the cementitious layer such that the suffused zone has a third thickness that is less than half the second thickness.

According to at least one embodiment, the process can be repeated to obtain multiple polymer layers and multiple cementitious layers having suffused zones. According to some embodiments, the polymer can be selected from the group consisting of polyvinyl alcohol, polyvinylpyrrolidone, polylactic acid, liquid crystal elastomer, and combinations of the same. According to at least one embodiment, a stimulus can be used to manipulate the suffused zone. For example, the polymer can be a liquid crystal elastomer, and the stimulus can be selected from the group consisting of a temperature change, electric field, magnetic field, radiation, and any combination of the same. According to at least one embodiment, the first thickness can be between 0.05 millimeters (mm) and 10 mm. According to at least one embodiment, the second thickness can be between 0.05 mm and 100 mm. According to at least one embodiment, the polymer can include a conductive material. The conductive material can be selected from the group consisting of carbon fibers, polyaniline fibers, polythiophenes, carbon nanotubes, carbon nanofibers, copper, zinc, aluminum, nickel-aluminum alloys, and combinations of the same. According to at least one embodiment, the layered multi-material structural element includes a conductive material configured to provide a piezo-response to a changing load. According to at least one embodiment, the steps of the process are carried out in a wellbore.

In a second aspect, a process for making a multi-material structural element having controlled mechanical failure characteristics is provided. The process includes the steps of supplying a loaded projecting member and a soluble retaining member on the loaded projecting member, wherein the loaded projecting member comprises a polymer and is loaded with potential mechanical energy, and wherein the soluble retaining member is at least partially soluble in a cement slurry; contacting the soluble retaining member with a cement slurry such that the soluble retaining member is at least partially dissolved and the loaded projecting member is released and projects into the cement slurry to form a released projecting member; and curing the cement slurry such that a suffused zone is formed where the released projecting member contacts the cement slurry polymer to obtain the multi-material structural element having controlled mechanical failure characteristics.

According to at least one embodiment, the loaded projecting member includes a polymer selected from the group consisting of polyvinyl alcohol, polyvinylpyrrolidone, polylactic acid, liquid crystal elastomer, and combinations of the same. According to at least one embodiment, the soluble retaining member includes an alkaline-sensitive polymer. According to at least one embodiment, the soluble retaining member includes a polymer selected from the group consisting of polyvinyl acetate, polyvinyl alcohol, polylactic acid, and combinations of the same. According to at least one embodiment, the soluble retaining member includes a water-sensitive polymer. According to at least one embodiment, the soluble retaining member can have a thickness that is between 1 micrometer ($\mu$m) and 20 centimeters (cm).

In a third aspect, a process for making a layered structural element having controlled mechanical failure characteristics is provided. The process includes the steps of forming a sacrificial mold by additive manufacturing, the sacrificial mold having a negative geometric contour that defines a positive geometric void; supplying a cement slurry and filling the positive geometric void of the sacrificial mold with the cement slurry such that the cement slurry contacts the negative geometric contour directly and forms a positive geometric void that fits at least a portion of the negative geometric contour of the sacrificial mold; curing the cement slurry to form a cement-mold composite including the sacrificial mold and a cured cement shape such that a suffused zone is formed where the cement slurry and the cured cement shape meet; and partially dissolving the sacrificial mold from the cement-mold composite such that a portion of the sacrificial mold remains adhered to the cured cement shape and the structural element is obtained.

According to at least one embodiment, the positive geometric void of the structural element can have a shape that includes a Schwarzite structure. According to at least one embodiment, the sacrificial mold can include a water-soluble polymer. According to at least one embodiment, the sacrificial mold includes a polymer selected from the group consisting of polyvinyl alcohol, polyvinylpyrrolidone, polylactic acid, and combinations of the same. According to at least one embodiment, the portion of the sacrificial mold that remains adhered to the cured cement shape has a uniform thickness between 10 and 1,000 µm. According to at least one embodiment, the step of curing the cement slurry includes allowing the cement slurry to cure for a period of time between two hours and seven days. According to at least one embodiment, the step of partially dissolving the sacrificial mold can be carried out using an aqueous solvent.

In a fourth aspect, a layered structural element having improved mechanical properties is provided. The layered structural element includes a cured cement shape; a polymer layer adhered to the cured cement shape; and a geometric shape that includes a Schwarzite structure. The structural element can have controlled mechanical failure characteristics. According to at least one embodiment, the polymer layer can have a uniform thickness between 10 and 1,000 µm. According to at least one embodiment, the polymer layer includes a polymer selected from the group consisting of polyvinyl alcohol, polyvinylpyrrolidone, polylactic acid, and combinations of the same.

BRIEF DESCRIPTION OF THE DRAWINGS

The embodiments disclosed here will be understood by the following detailed description, along with the accompanying drawings. The embodiments shown in the figures only illustrate several embodiments of the disclosure. The disclosure admits of other embodiments not shown in the figures and is not limited to the content of the illustrations.

DETAILED DESCRIPTION

Figure 1:
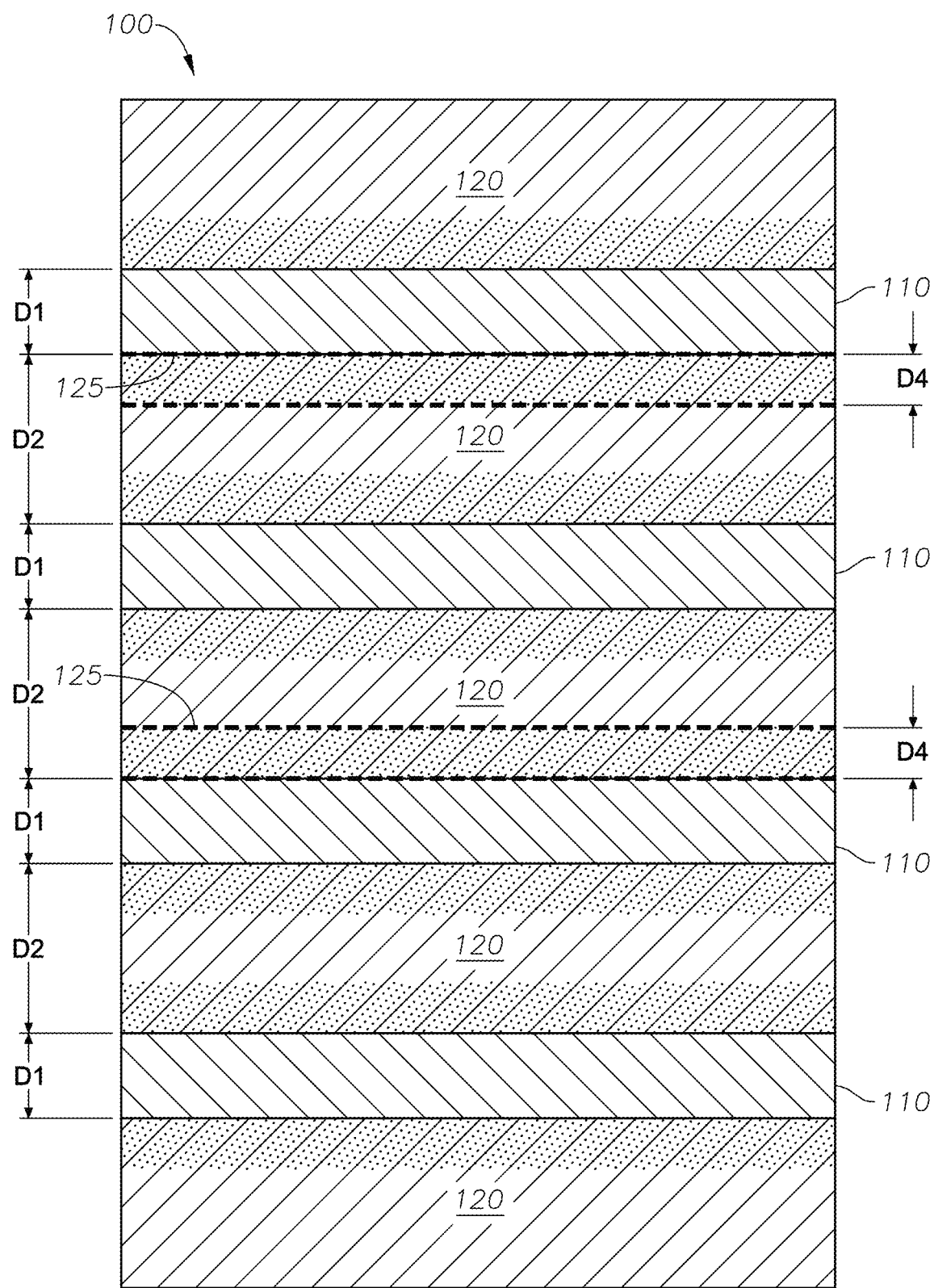
FIG. 1 is an illustration of a layered structural element having controlled failure characteristics.

For certain embodiments, many details are provided for a thorough understanding of the various components or steps. In other instances, well-known processes, devices, compositions, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes should not be taken in a limiting sense. This disclosure is intended to disclose certain embodiments with the understanding that many other undisclosed changes and modifications can fall within the spirit and scope of the disclosure. The patentable scope is defined by the claims and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," "in at least one embodiment," or "in embodiments," which can each refer to one or more of the same or different embodiments. Furthermore, the terms "comprising," "including," "having," and the like, as used with respect to embodiments of the present disclosure, are synonymous.

All numbers expressing quantities, percentages or proportions, and other numerical values used in the specification and claims are to be understood as being modified in all instances by the term "about" unless otherwise indicated. The term "about" applies to all numeric values, whether or not explicitly indicated. Values modified by the term "about" can include a deviation of at least ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit, as well as the upper limit and the lower limit; and includes lesser ranges of the interval subject to any specific exclusion provided.

Unless otherwise defined, all technical and scientific terms used in this specification and the appended claims have the same meanings as commonly understood by one of ordinary skill in the relevant art.

Where a method comprising two or more defined steps is recited or referenced in this disclosure or the appended claims, the defined steps can be carried out in any order or simultaneously except where the context excludes that possibility.

As used in this disclosure, the term "suffused zone" is defined as the region that is bounded by 100% cementitious material in cementitious layers or shapes and 100% polymer material in polymer layers, with a varying combination of cementitious material and polymer between the boundaries. The thickness of a suffused zone is the average thickness between these boundaries. A suffused zone can be formed by the suffusion of polymer into cement, cement into polymer, or both.

The methods disclosed here involve using additive manufacturing to form layered multi-material structural elements having controlled failure characteristics. The layered multi-material structural elements can include equilibrium suffused zones, and in some embodiments controlled suffused zones. The suffused zones can increase toughness, improve damping, distribute the load from an impact more evenly through the structure to prevent failure, and introduce controlled failure characteristics to the structural elements. According to at least one embodiment, the suffused zones can be controlled, manipulated, or augmented using a stimulus (e.g., temperature change, electric field, magnetic field, etc.). Advantageously, the methods disclosed here can be used to manufacture structures in a wellbore such that the structures have controlled failure characteristics and improved mechanical characteristics such as toughness.

FIG. 1 shows an illustration of a layered multi-material structural element 100. The layered multi-material structural element 100 includes polymer layers 110, cementitious layers 120, and a suffused zone 125. The polymer layer can include polymers suitable for use in additive manufacturing applications. Nonlimiting examples of suitable polymers include polyvinyl alcohol, polyvinyl acetate, polyvinylpyrrolidone, polylactic acid, liquid crystal elastomers, etc. The material used to form the cementitious layer can include any hardened stone-like material such as cement, concrete, mortar, stucco, grout, etc. that is capable of allowing polymer to suffuse into it. According to at least one embodiment, the cementitious layers 120 can include Portland cement. The suffused zones 125 can include materials from both the polymer layers 110 and the cementitious layers 120, and can be considered to be a portion of the cementitious layer 120 that is suffused with polymer from the polymer layer 110, or vice versa. The polymer layer 110 and the cementitious layer 120 can be positioned so that they are in direct contact; and the suffused zone 125 can be formed in the cementitious layer 120 where the polymer layer 110 and the cementitious layer 120 meet.

The polymer layers 110, cementitious layers 120, and suffused zones 125 have first thickness D1, second thickness D2, and fourth thickness D4, respectively. The first thickness D1 and second thickness D2 can be determined by the resolution and capabilities of the printer used to manufacture the layers. According to at least one embodiment, first thickness D1 can be less than second thickness D2. According to at least one embodiment, second thickness D2 can be less than first thickness D1. According to at least one embodiment, first thickness D1 can be between about 0.01 millimeters (mm) and about 10 mm, preferably between about 0.05 mm and about 5 (mm), more preferably between about 0.05 mm and about 2 mm, even more preferably between about 0.05 mm and about 1 mm. According to at least one embodiment, the polymer layer can have first thickness D1 that is about 500 μm.

The second thickness D2 can be determined by the material characteristics, and the resolution and capabilities of the printer, techniques, or both used to manufacture the layers. According to at least one embodiment, second thickness D2 can be between about 0.02 mm and about 100 mm, preferably between about 0.1 mm and about 40 mm, more preferably between about 0.1 mm and about 20 mm, even more preferably between about 0.1 mm and about 10 mm. The magnitude of the second thickness D2 can be between about 1 and 10 times the magnitude of the first thickness D1.

According to at least one embodiment, fourth thickness D4 is between about 0.01 and about 0.75 of second thickness D2, preferably between about 0.05 and less than about 0.5 of second thickness D2, more preferably between about 0.1 and about 0.3 of second thickness D2.

According to at least one embodiment, the polymer layers 110 can be discrete layers of polymeric material. The presence of a discrete layer of polymeric material in the structural element can provide the structural element with improved damping characteristics. According to at least one embodiment, the cement layer can be positioned between at least two of the polymer layers 110 and can have at least two corresponding suffused zones 125. The multi-material structural element 100 can include multiple layers alternating between polymer layers 110 and cementitious layers 120; each cementitious layer 120 positioned between two or more polymer layers 110 having at least two suffused zones 125. According to at least one embodiment, the polymer of the suffused zones 125 does not suffuse completely through the cementitious layer 120, such that there exists a region of 100% cementitious material. Designing the structural element so that the cementitious layers 120 have a region of 100% cementitious material has certain advantages, such as conserving the polymer.

According to at least one embodiment, the thickness of the suffused zones 125 can be minimized to allow for slip planes, or a region of relatively weak adhesion between the cementitious layer 120 and the polymer layer 110. Slip planes can be designed in the layered multi-material structural element 100 to help absorb impacts and mechanical shocks. Another method of regulating slippage between the cementitious layer 120 and the polymer layer 110 involves chemically modifying the polymer or selecting a polymer on the basis of its affinity for the cementitious material. In addition to influencing the degree of slippage between layers, a polymer's affinity for the cementitious material can affect the transfer of mechanical energy from one layer to the next; without being limited by theory, a polymer with a greater affinity for the cementitious material would likely result in increased transfer and decreased absorption of mechanical energy from one layer to the next, and a polymer with a lesser affinity for the cementitious material would likely result in decreased transfer and increased absorption of mechanical energy.

The polymer layers 110 and the cementitious layers 120 of the layered multi-material structural element 100 can be manufactured using additive manufacturing techniques. Additive manufacturing, also known as three-dimensional printing, involves using digital three-dimensional model data (such as computer-aided design data) to build up objects by depositing material. Fused deposition modeling is an additive manufacturing process that involves ejecting a thermoplastic material from a temperature-controlled nozzle to form an object layer by layer. Presently, commercial additive manufacturing printers are capable of a resolution of about 10 micrometers (μm) in the x-y Cartesian plane, and about 20 μm in the direction of the Cartesian z-axis using fused deposition modeling. Accordingly, commercial additive manufacturing printers are capable of printing detailed and relatively complex shapes.

Figure 2:
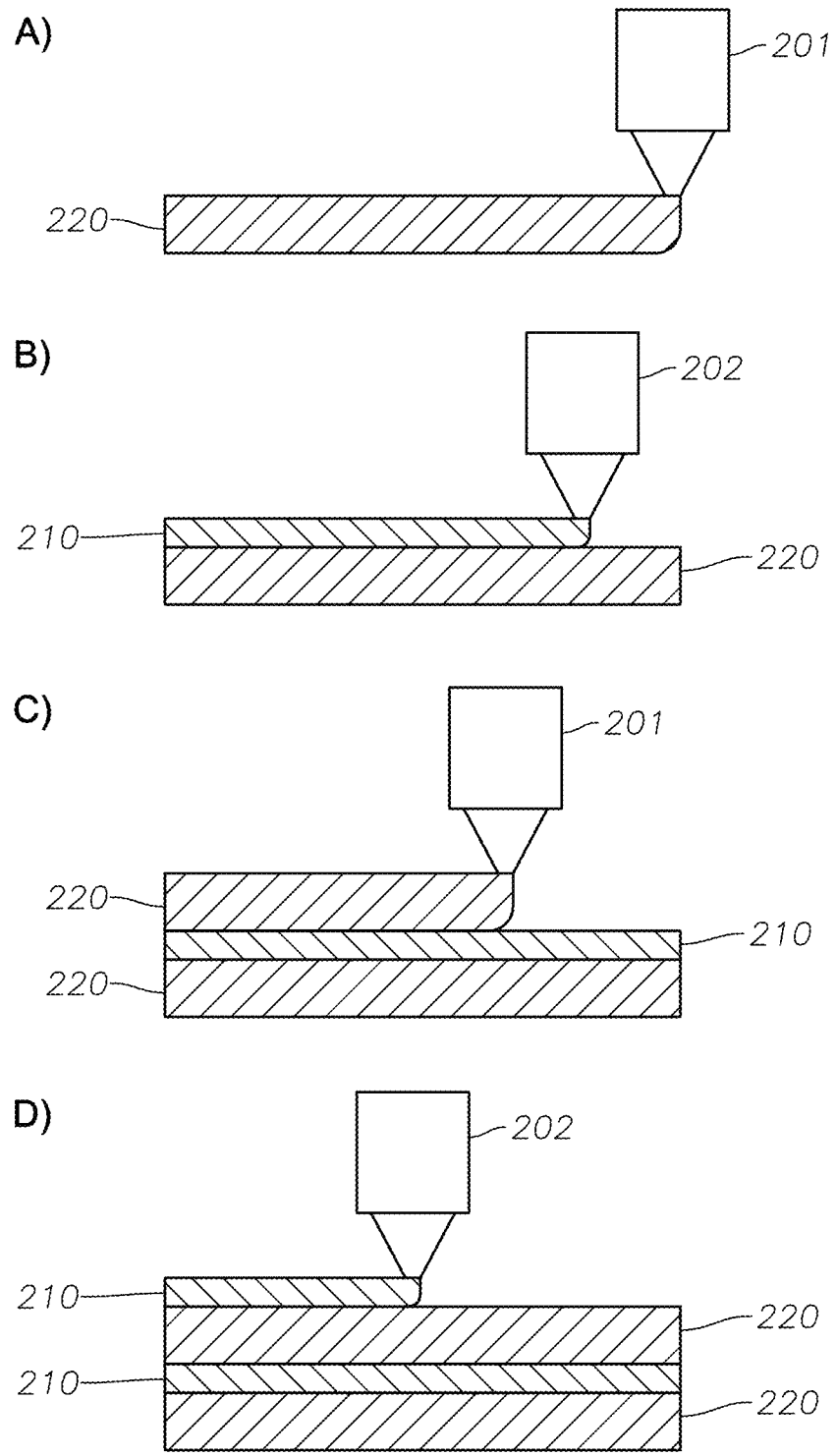
FIG. 2 is an illustration of a process of manufacturing, by additive manufacture, a layered structural element having controlled failure characteristics.

Referring to FIG. 2 which shows an example of an additive manufacturing technique, step 2A shows a first nozzle 201 depositing and forming a cementitious layer 220 having a desired thickness. Step 2B shows a second nozzle 202 depositing and forming the polymer layer 210 having a desired thickness. Step 2C shows the first nozzle 201 depositing and forming a cementitious layer 220 over the surface of the polymer layer 210. Step 2D shows second nozzle 202 depositing and forming a polymer layer 210 over the surface of the cementitious layer 220. The process can be repeated, with alternating polymer layers 210 and cementitious layers 220 until the structural element is formed having the desired geometric shape. According to at least one embodiment, steps 2A-2D can be carried out using a direct ink writing technique. According to at least one embodiment, steps 2B-2D are carried out at spaced time intervals so that material deposited during the previous step is allowed to cure. The timing of these steps can be determined so that the printed cementitious material or polymer is allowed to harden, set, or both before a subsequent layer is printed. The shape of the material to be printed should be considered when determining the duration of the time intervals is sufficient to allow the cementitious material or polymer to hold its geometry; particularly when the gel strength or storage modulus of the cementitious material or polymer is too low to maintain its geometry under the weight of multiple layers. In such instances, it may be necessary to allow the cementitious material or polymer to harden, set, or both before depositing or forming a subsequent layer. One of ordinary skill will conceive of various other techniques for forming the various layers of the structural element. It is contemplated that polymer layers could be printed onto previously formed cementitious layers that are formed by additive manufacturing techniques or otherwise.

Figure 3:
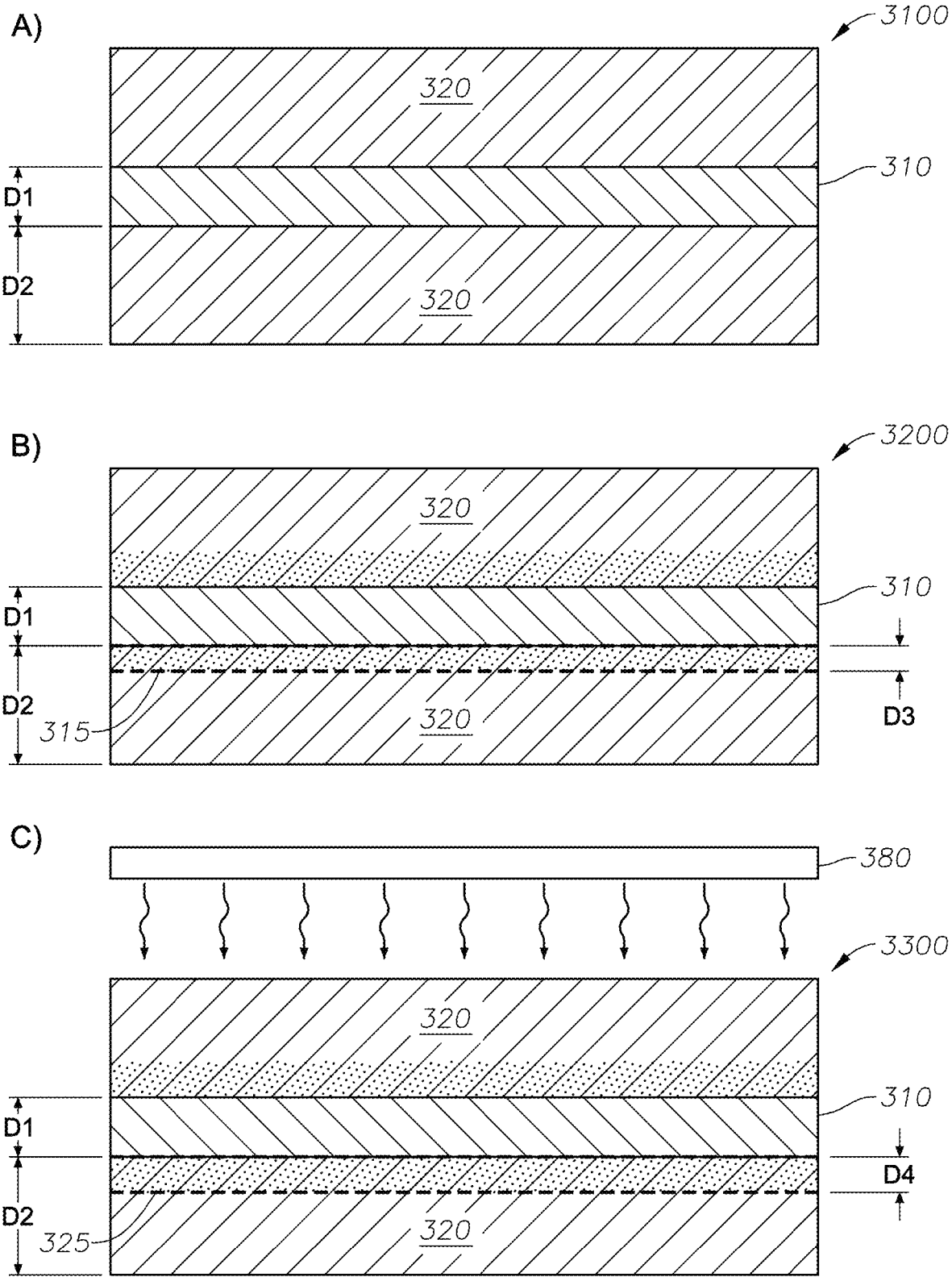
FIG. 3 is an illustration of a layered structural element (A) a layered structural element having an equilibrium suffused zone (B), and a layered structural element having a controlled suffused zone (C).

Referring now to FIG. 3, a recently formed layered multi-material structural element 3100 is shown in 3A, having cementitious layers 220 and a polymer layer 310. The polymer layer 310 has a first thickness D1, and the cementitious layers 220 have a second thickness D2. The polymer material in the polymer layer 310, the cementitious material of the cementitious layer 320, or both are at least partially uncured. In step 3A the polymer of the polymer layer 310 has not suffused through the cementitious layers 320, and a suffused zone is absent in the cementitious layers 220. In step 3B, the at least partially uncured polymer material of the polymer layer 310 is allowed to suffuse through the cementitious material of the cementitious layer 320 over a period of time to form an equilibrium suffused zone 315 in the cementitious layers 320. Though step 3B shows the polymer material suffused into the cementitious layers 320, uncured cementitious material of the cementitious layer 320 may suffuse into the polymer layer 310, or a combination of polymer and cementitious material may suffuse into either layer.

According to at least one embodiment, the equilibrium suffusion of polymer material into the cementitious material of cementitious layer 320 (or vice versa) can be carried out without an external stimulus. That is, unassisted suffusion is carried out to equilibrium resulting in an equilibrium suffused zone 315 having a third thickness D3. Step 3B shows equilibrium suffused zone 315 having third thickness D3. According to at least one embodiment, the polymer and cementitious material are allowed to cure to obtain a layered multi-material structural element 3200, having an equilibrium suffused zone 315.

Step 3C shows a stimulus 380 being used to manipulate suffusion of the polymer or cementitious material to obtain a controlled suffused zone 325. Depending on the type of stimulation, the stimulus can be provided before, during, or after the polymer cures. The stimulus 380 can be any stimulus capable of altering the suffusion of the polymer or cementitious material. Nonlimiting examples of suitable stimuli include those capable of producing a temperature change, electric field, magnetic field, radiation, or any combination of the same. For materials that do not include particulates that obscure or scatter light the way many cementitious materials do, the stimulus can be ultraviolet, visible, or near-infrared light. According to at least one embodiment, the polymer material can include a liquid crystal elastomer that is sensitive to changes in temperature, and the stimulus 380 can be heat provided by a heat source, so that heat causes the liquid crystal elastomer to suffuse further into the cementitious layer 320. Once the desired suffusion has been carried out, the equilibrium suffused zone 315 can have a fourth thickness D4 that is different from third thickness D3. According to at least one embodiment, the fourth thickness D4 is greater than third thickness D3. The difference between D3 and D4 will depend on the materials, stimulus, and geometry used. According to at least one embodiment, the difference between D3 and D4 can be between about 1 nanometer (nm) and 100 centimeters (cm), alternately between about 1 nm and about 50 cm, alternately between about 1 nm and 20 cm, alternately between about 1 nm and about 10 cm, alternately between about 1 nm and about 5 cm, alternately between about 1 nm and about 1 cm, alternately between about 1 micrometer (μm) and 100 cm, alternately between about 1 μm and 50 cm, alternately between about 1 μm and about 20 cm, alternately between about 1 μm and about 10 cm, alternately between about 1 μm and 5 cm, alternately between about 1 μm and 1 cm, alternately between about 1 mm and 100 cm, alternately between about 1 mm and 50 cm, alternately between about 1 mm and 20 cm, alternately between about 1 mm and 10 cm, alternately between about 1 mm and 5 cm, alternately between about 1 cm and 100 cm, alternately between about 1 and 50 cm, alternately between about 1 and 20 cm, alternately between about 1 and 10 cm, alternately between about 1 and 5 cm. The structural element obtained by this process is referred to in this disclosure as a layered multi-material structural element 3300 having a controlled suffused zone 325.

Conventional methods for casting cement structural elements typically involve pouring cement into simple molds or forms. Shapes having inner surfaces are particularly difficult to achieve using conventional techniques, sometimes requiring complex mold assemblies with multiple parts or casting multiple simple cement structural elements and assembling them after they have cured. Direct printing with cement enables the manufacture of more complex structures, but generally requires special additives that cause the cement to gel quickly. Also disclosed are methods that involve using additive manufacturing to form sacrificial molds for casting complex shapes, such as Schwarzite structures, having suffused zones. Sacrificial molds made from a polymer can be partially (that is, incompletely) dissolved after curing such that a layer of polymer remains on the surface of the cured cement shape. According to at least one embodiment, the layer of polymer that remains on the surface of the cured cement shape can facilitate the formation of suffused zones in the cured cement shape.

Advantageously, structural elements having a Schwarzite structure made by the disclosed method demonstrate controlled failure characteristics. Compared to conventional cement blocks, which fail suddenly and catastrophically, structural elements having a Schwarzite structure generally incrementally fail in stages as compressive stress increases. In addition to failing incrementally in stages, structural elements having a Schwarzite structure demonstrate moderate damping behavior. It has also been found that structural elements made according to certain embodiments disclosed have greater toughness and deformation recovery after unloading than conventional cement blocks. Moreover, structural elements having a Schwarzite structure require less cement material than conventional solid cement blocks.

Figure 4B:
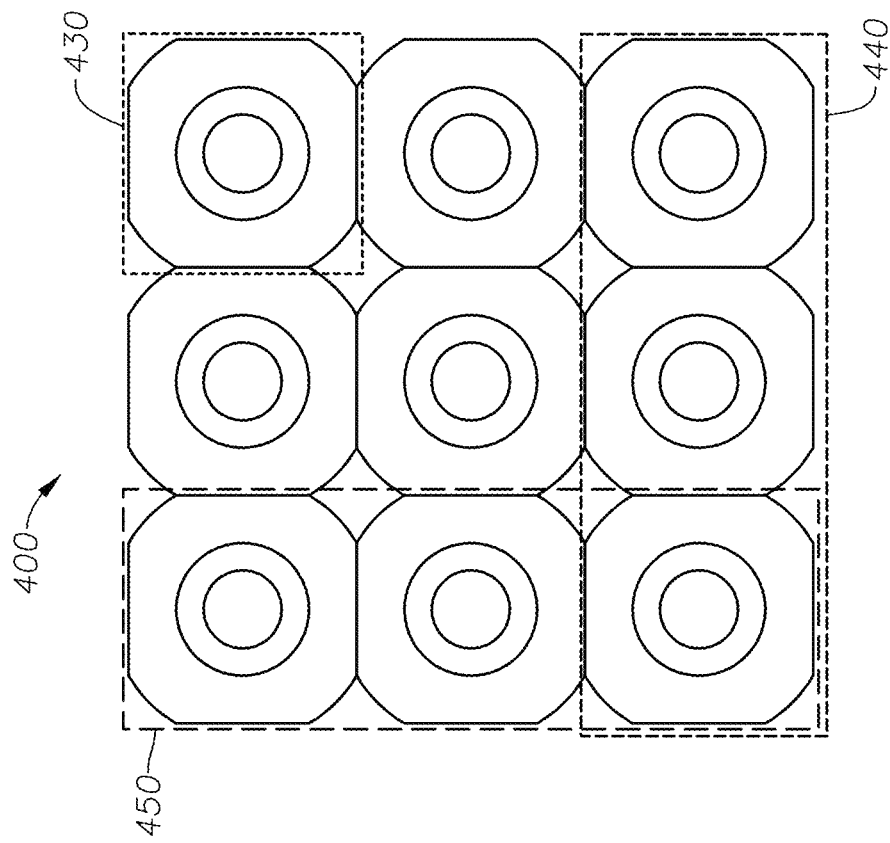
FIG. 4B is an elevational view of an illustration of an embodiment of a cement structural element having a primitive Schwarzite geometric shape.
Figure 4A:
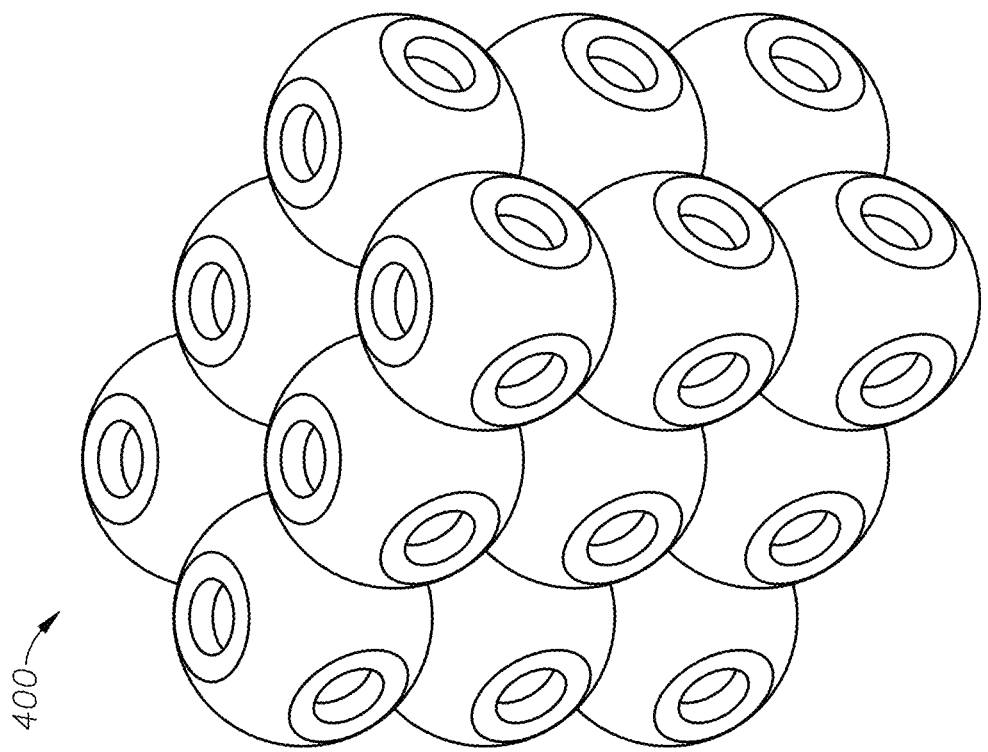
FIG. 4A is a perspective view of an illustration of an embodiment of a cement structural element having a primitive Schwarzite geometric shape.

Schwarzite structures are three-dimensional porous structures having periodic Schwarzite unit shapes, the periodic Schwarzite unit shapes having a negatively curved surface. In at least one embodiment, the Schwarzite structure can have a primitive structure, which includes two intertwined congruent networks of passages, each having a shape that resembles an inflated tubular version of a simple cubic lattice. In at least one embodiment, the Schwarzite structure can have a gyroid structure, which is an embedded member of the Schwarz family that includes an infinitely integrated triply periodic minimal surface in the absence of straight lines and reflectional symmetries. By way of example and not limitation, an example of a layered multi-material structural element 100 having a primitive Schwarzite structure is shown in FIG. 4. FIG. 4A is an illustration of a perspective view of the structural element 400. FIG. 4B is an illustration of an elevational view of the structural element 400. The structural element 400 of FIG. 1B includes a unit shape 430, having six openings on six sides, and a general spherical shape. The unit shape 430 defines a spherical void. The structural element 400 of FIG. 4B can include multiple unit shapes 430 arranged in columns 450, rows 440, or both. Columns 450 can include unit shapes 430 aligned vertically, and rows 440 can include unit shapes 430 aligned horizontally. In this disclosure, the terms "horizontal" and "vertical" are given for reference only; and a person of ordinary skill will appreciate that the structural element 400, rows 440, and columns 450 can be oriented in any direction. In some embodiments, the structural element 400 includes at least two unit shapes 430.

The method of making a structural element having controlled mechanical failure characteristics includes manufacturing a sacrificial mold by additive manufacture. According to at least one embodiment, the sacrificial mold is manufactured by additive manufacturing that includes fused deposition modeling with a polymer.

Figure 5:
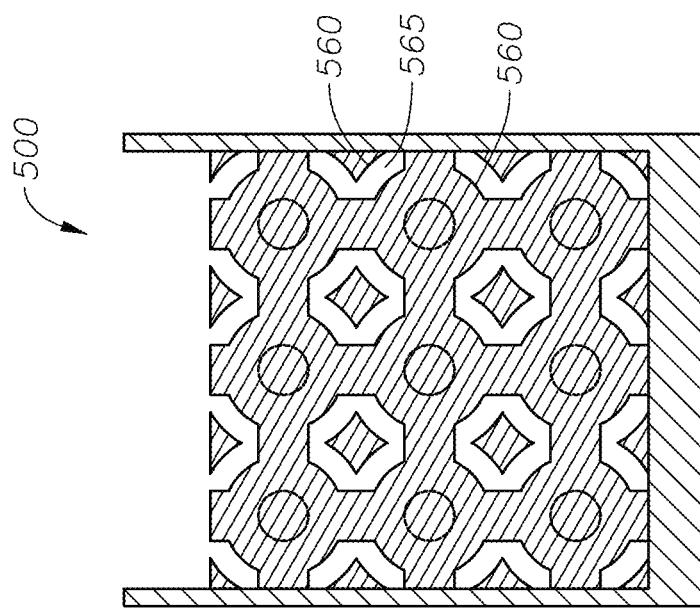
FIG. 5 is an illustration of a sacrificial mold for a primitive Schwarzite structural element showing a perspective view thereof (A), a top view thereof (B), and a sectional view thereof (C) taken along lines A-A.
Figure 5:
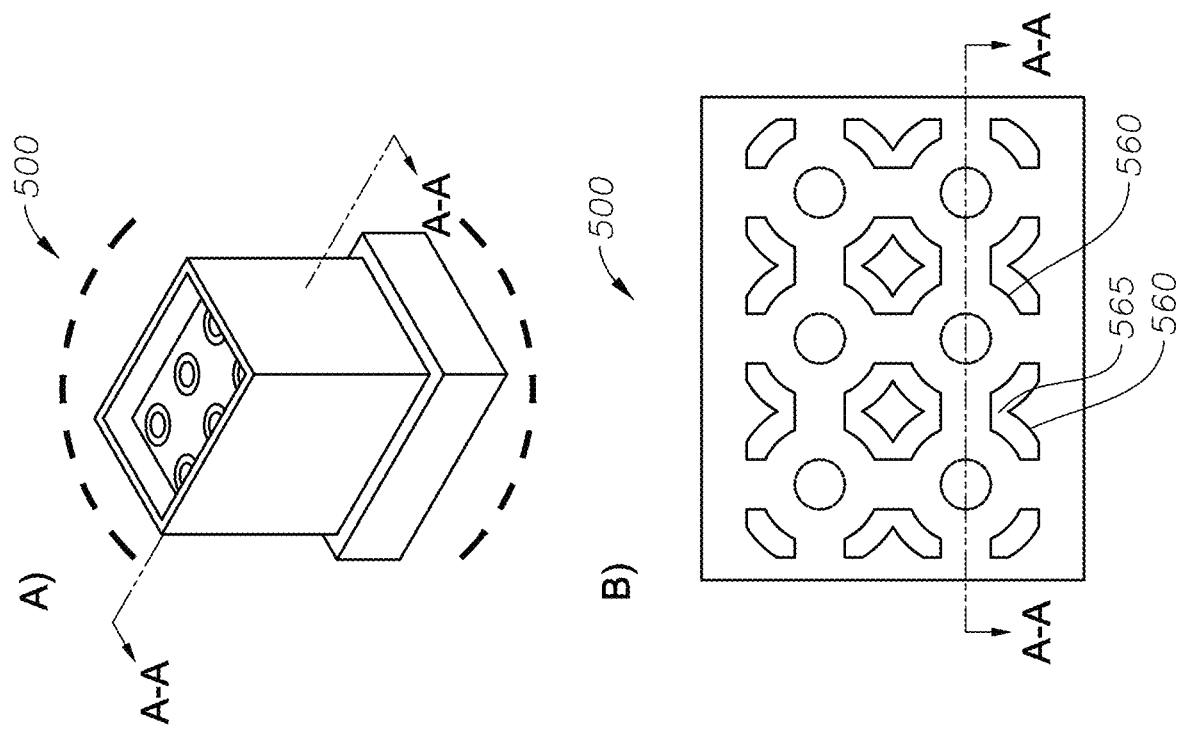

By way of example and not limitation, FIG. 5 shows an illustration of example of a sacrificial mold 500 for a structural element having a Schwarzite shape. FIG. 5A shows an illustration of a perspective view of a sacrificial mold 500 for making a structural element having a Schwarzite shape, FIG. 5B shows a top view thereof, and FIG. 5C shows a cross-sectional view taken along lines A-A. The sacrificial mold 500 has a negative geometric contour 560 that defines a positive geometric void 565. The sacrificial mold 500 can also have a one-piece construction; that is, the sacrificial mold 500 can consist of a single contiguous multifaceted unit that is formed by the printer without additional assembly. According to at least one embodiment, the sacrificial mold 500, which defines the positive geometric void 565, has one-piece construction and is limited to one material, such as a polymer; though auxiliary components, features, or both that do not define the positive geometric void 565 (e.g., support structures, fasteners, adapters, accessories, and other auxiliary parts) may be on, near, or attached to the one-piece sacrificial mold 500 such that they do not define the positive geometric void 565.

According to at least one embodiment, the sacrificial mold can be manufactured from a polymer using fused deposition modeling. The polymer can be soluble in a solvent. The type of polymer depends on the type of solvent that is used to dissolve the polymer, and vice versa. In at least one embodiment, the solvent can be an aqueous solvent. By way of example and not limitation, the polymer can be a water-soluble polymer such as polyvinyl alcohol, polyvinylpyrrolidone, polylactic acid, etc. Polyvinyl alcohol is particularly suitable for use with an aqueous solvent because it is relatively hydrophilic and soluble in water. One of ordinary skill will understand that some additive manufacturing printers are capable of printing multiple materials (such as metals, ceramics, powders, carbon fibers, etc.). It is contemplated that a sacrificial mold may include a polymer and at least one other material. In such embodiments, the polymer should define the negative geometric contour of the sacrificial mold such that the cement slurry contacts the polymer when it is poured into the sacrificial mold.

A method of making a structural element having controlled mechanical failure characteristics includes supplying a cement slurry. The cement slurry can be prepared using conventional techniques known to a person of ordinary skill in the art. The type of cement used to prepare the cement slurry is not particularly limited. By way of example and not limitation, an example of a suitable cement is Portland cement.

Once the sacrificial mold is formed, the cement slurry can be introduced to the sacrificial mold such that the cement slurry contacts the negative geometric contour of the sacrificial mold and fills the positive geometric void. According to at least one embodiment, a pressure differential across the cement slurry can be used to draw the cement slurry into the positive geometric void. By way of example and not limitation, an at least partial vacuum can be formed in the positive geometric void using a vacuum pump to pull the cement slurry into the positive geometric void, pressure outside of the positive geometric void can be increased to push the cement slurry into the positive geometric void, or both. The sacrificial mold can also be shaken or vibrated to cause the cement slurry to settle into spaces in the positive geometric void.

The cement slurry is cured for a period of time after being introduced to the sacrificial mold to obtain a cement-mold composite that includes the sacrificial mold and a cured cement shape. In the process of curing the cement shape, cement slurry can suffuse into the polymer of the sacrificial mold to form suffused zones. According to at least one embodiment, the curing process can be carried out at ambient temperature for a period of time that is between about 2 hours and 7 days. The cured cement shape can have any structural shape. According to at least one embodiment, the cured cement shape can have a honeycomb structure (that is, a pattern with identical periodic repeating hexagonal units having shared sides). According to at least one embodiment, the cured cement shape can have a Schwarzite structure. According to at least one embodiment, a stimulus can be used to manipulate or control suffusion of the cement slurry into the polymer of the sacrificial mold.

After the cement-mold composite is obtained, it can be treated with a solvent to partially (that is, incompletely) dissolve the mold from the cement-mold composite such that a portion of the sacrificial mold remains adhered to the cured cement shape and the structural element is obtained. The cement-mold composite can be exposed to a solvent for a period of time to partially dissolve the sacrificial mold. In some embodiments, the cement-mold composite includes a polymer, such as polyvinyl alcohol, that suffuses into curing cement such that the portion of the polymer that suffuses is fused with the cement and remains adhered to the cement when exposed to a solvent and the bulk of the polymer is dissolved. According to at least one embodiment, an elastomer can be used to make the sacrificial mold. According to at least one embodiment, a liquid crystal elastomer can be used to make the sacrificial mold or a component of the sacrificial mold. In some embodiments, the degree of dissolution of the sacrificial mold can be controlled by varying the amount of time that the sacrificial mold is exposed to the solvent, varying the temperature of the solvent, varying the pH of the solvent, varying the thickness of layers of polymer during printing, or any combination of the same.

By way of example and not limitation, a cement-mold composite having a sacrificial mold that includes a water-soluble polymer can be immersed in water for a period of time to dissolve the water-soluble polymer and the bulk of the sacrificial mold, and then removed from the water before the sacrificial mold is completely dissolved such that a layer of the water-soluble polymer remains adhered to the cured cement shape. The process of partially dissolving the sacrificial polymer can include heating the solvent. According to at least one embodiment, a sacrificial mold that includes polyvinyl alcohol can be partially dissolved by soaking the cement-mold composite in warm water (that is, water having a temperature between about 40° C. and 90° C.) for a period of time that is between about 12 hours and 96 hours.

The remaining portion of the sacrificial mold can be firmly adhered to the cured cement shape. According to at least one embodiment, the remaining portion of the sacrificial mold can be a substantially uniform layer of polymer having average thickness between about 1 µm and 1,000 µm. Advantageously, the remaining portion of the sacrificial mold improves the mechanical resilience of the structural element. For example, the remaining portion of the sacrificial mold can increase toughness and improve the damping ability of the structural element.

Like the cured cement shape, the structural element can have any three-dimensional geometric shape. According to at least one embodiment, the structural element can have a honeycomb shape with periodic repeating units. According to at least one embodiment, the structural element can have a Schwarzite structure. In at least one embodiment, the Schwarzite structure can have periodic repeating units arranged in horizontal layers and vertical columns.

Structural elements having a Schwarzite structure (including both primitive and gyroid Schwarzite structures) can have controlled failure characteristics. Failure in structural elements having controlled failure characteristics occurs incrementally in stages. By way of example and not limitation, an increasing uniaxial compressive load in the vertical direction on a structural element having a Schwarzite structure with multiple rows and columns can cause fractures to substantially propagate through successive rows of unit shapes in the horizontal direction, rather than randomly. Compared with cement blocks and honeycomb structures, which fracture randomly and catastrophically, the structural element under a uniaxial compressive load in the vertical direction fails in a controlled manner, row-by-row, or layer-by-layer, with fractures propagating horizontally.

Figure 6:
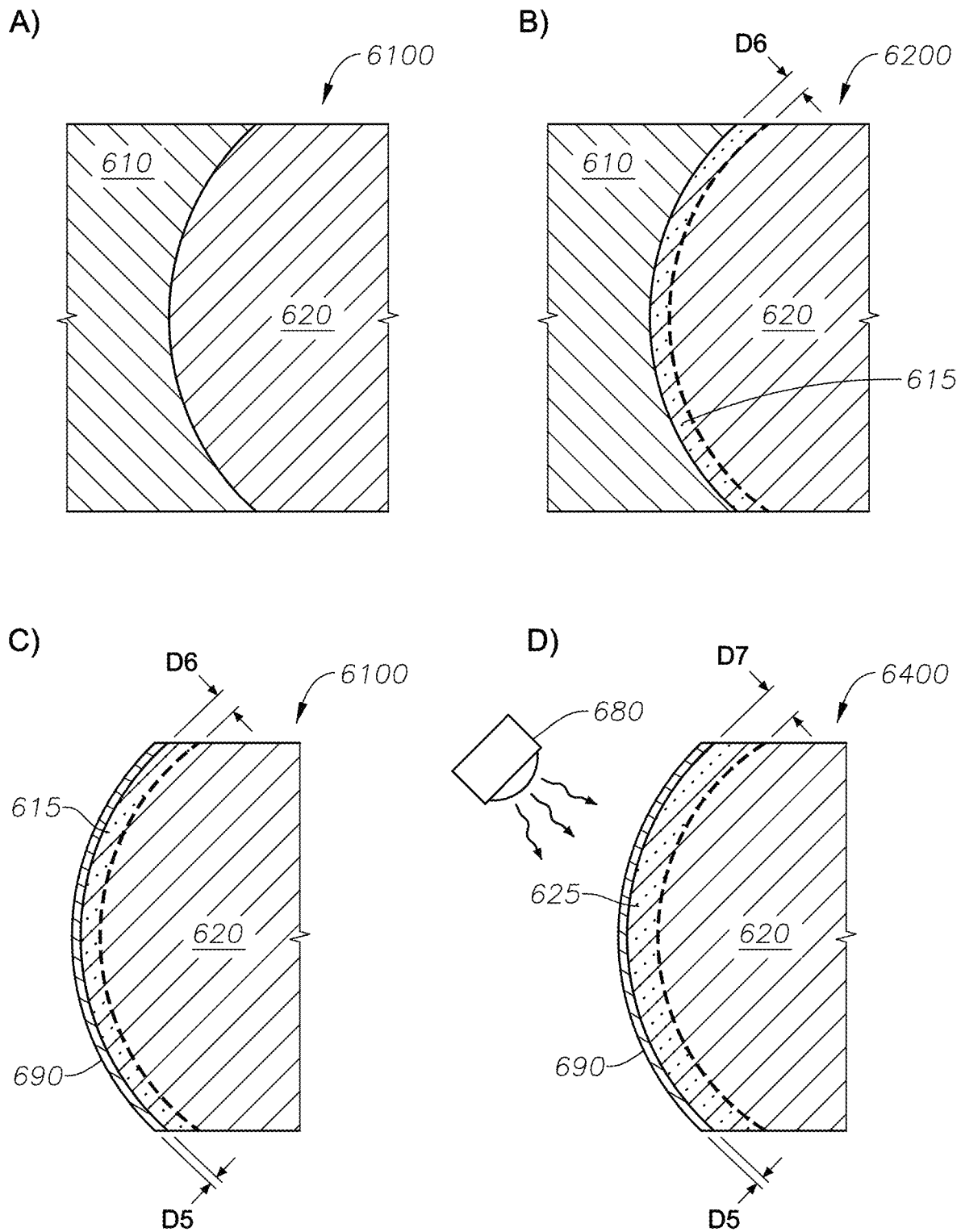
FIG. 6 is an illustration of a sectional view of a portion of a cement-mold composite showing a view thereof (A) before a suffused zone is formed, a view thereof (B) after a suffused zone is formed, a view thereof (C) after the sacrificial mold is removed, a view thereof (D) showing a stimulus being applied to manipulate the suffused zone.

Referring to FIG. 6, step 6A shows a portion of an uncured cement-mold composite 6100. The uncured cement-mold composite 6100 includes a sacrificial mold 610 made from a polymer, and an uncured cement shape 620. The uncured cement-mold composite 6100 is in the absence of a suffused zone. Step 6B shows a cured cement-mold composite 6200 after the polymer from the sacrificial mold 610 has partially suffused into the cement material of the cement shape 620, forming an equilibrium suffused zone 615 having a sixth thickness D5. The cement shape 620 of cured cement-mold composite 6200 can be mostly cured or completely cured. Preferably, the cement is cured so that it has an ultimate compressive strength of at least about 0.2 MPa, more preferably at least about 1.0 MPa. The cured cement-mold composite 6200 can be treated with a solvent to dissolve the polymer of the sacrificial mold 610 and obtain a layered multi-material structural element 6300, having an equilibrium suffused zone 615 as shown in step 6C. In step 6C, a portion of the sacrificial mold 690 remains on the layered multi-material structural element 6300 having an equilibrium suffused zone 615. The portion of the sacrificial mold 690 has a fifth thickness D5. As described previously, fifth thickness D5 can be substantially uniform between about 10 μm and 1,000 μm.

As shown in step 6D, a stimulus 680 can be used to manipulate or augment suffusion of the polymer into the cement shape 620 to obtain a controlled suffused zone 625. The process of manipulating or augmenting the suffused zone can be carried out using the methods and techniques described previously for obtaining a controlled suffused zone in a layered multi-material structural element. According to at least one embodiment, the polymer material can include a liquid crystal elastomer that is sensitive to changes in temperature, and the stimulus 680 can be heat provided by a heat source, so that heat causes the liquid crystal elastomer to suffuse further into the cement shape 620. Once the desired polymer suffusion has been carried out, the equilibrium suffused zone 615 can have a seventh thickness D7 that is not equal to sixth thickness D6. According to at least one embodiment, the seventh thickness D7 is greater than sixth thickness D6. The difference between D7 and D6 will depend on the materials, geometry, and stimulus used. According to at least one embodiment, the difference between D7 and D6 can be between about 1 nanometer (nm) and 100 cm, alternately between about 1 nm and about 50 cm, alternately between about 1 nm and 20 cm, alternately between about 1 nm and about 10 cm, alternately between about 1 nm and about 5 cm, alternately between about 1 nm and about 1 cm, alternately between about 1 micrometer (μm) and 100 cm, alternately between about 1 μm and 50 cm, alternately between about 1 μm and about 20 cm, alternately between about 1 μm and about 10 cm, alternately between about 1 μm and 5 cm, alternately between about 1 μm and 1 cm, alternately between about 1 mm and 100 cm, alternately between about 1 mm and 50 cm, alternately between about 1 mm and 20 cm, alternately between about 1 mm and 10 cm, alternately between about 1 mm and 5 cm, alternately between about 1 cm and 100 cm, alternately between about 1 and 50 cm, alternately between about 1 and 20 cm, alternately between about 1 and 10 cm, alternately between about 1 and 5 cm. The structural element obtained by this process is referred to in this disclosure as a layered multi-material structural element 6400 having a controlled suffused zone 625.

Figure 7:
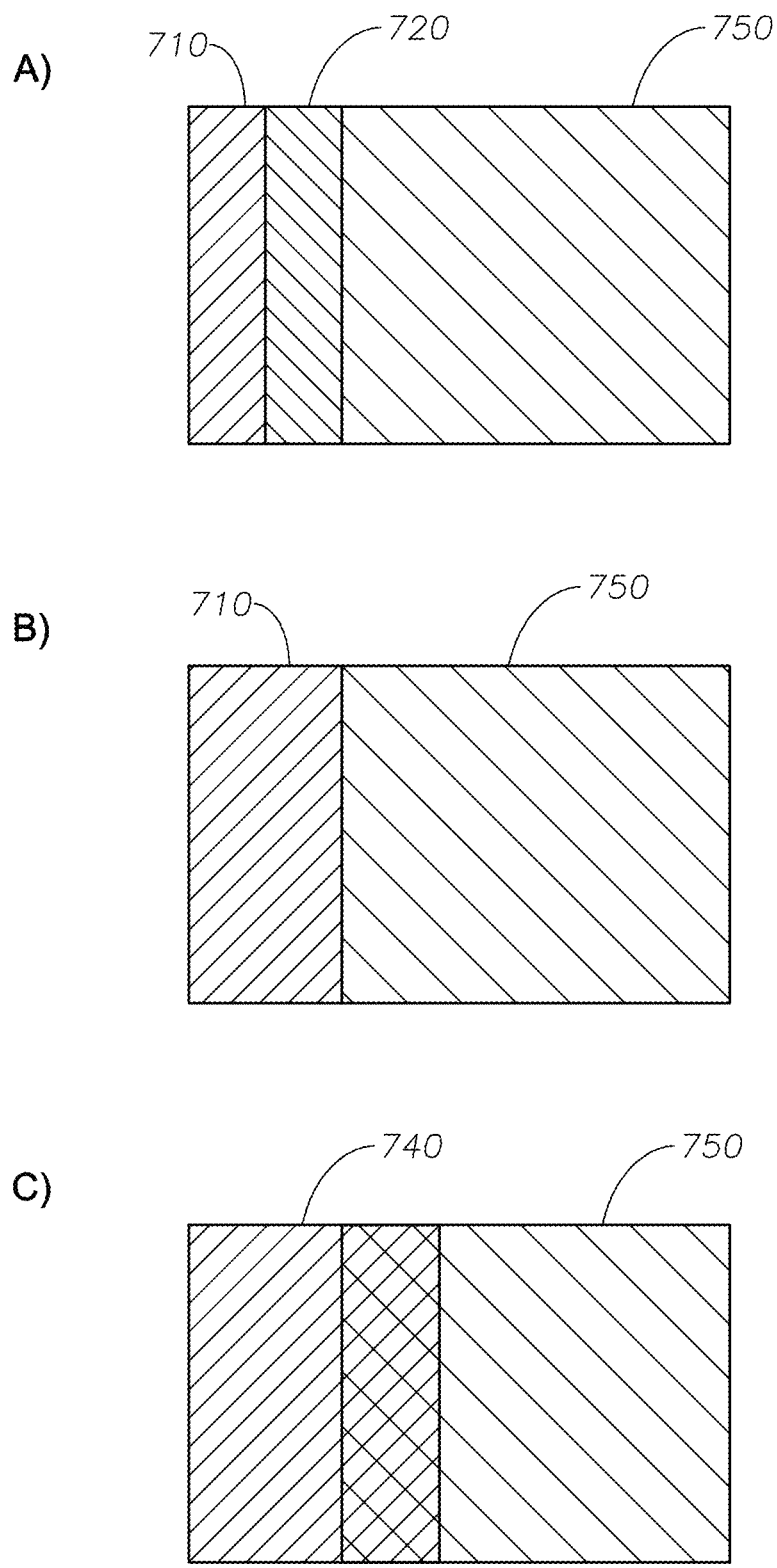
FIG. 7 is an illustration of a projecting member being projected into a cementitious multi-material structural element with a view thereof (A) showing a soluble retaining member holding back a loaded projecting member and separating it from a cement slurry, a view thereof (B) showing the loaded projecting member in contact with the cement slurry after the soluble retaining member is dissolved and immediately before the loaded projecting member projects into the cement slurry, and a view thereof (C) showing a released projecting member.
Figure 8:
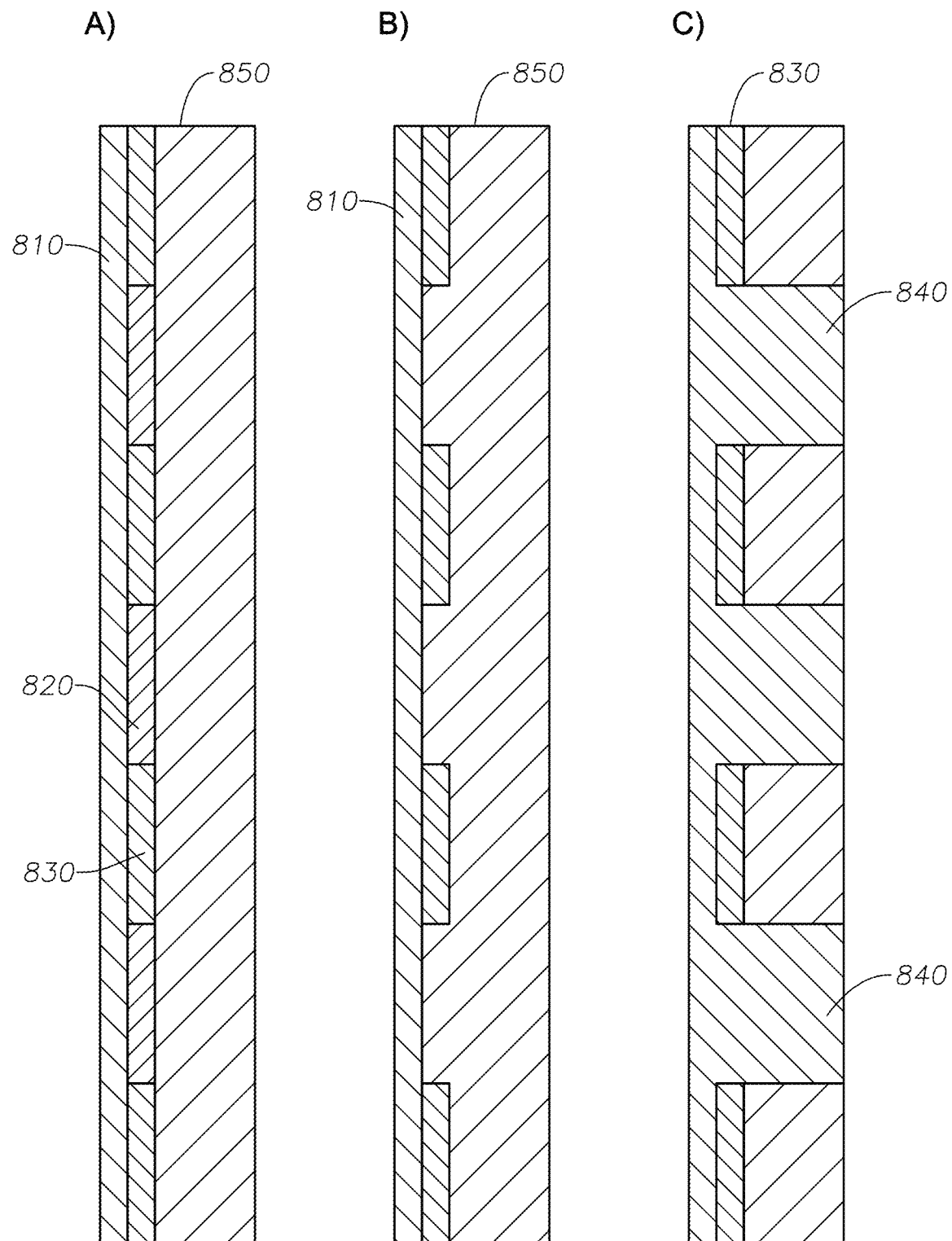
FIG. 8 shows an illustration of an embodiment of a process for manufacturing a layered multi-material structural element having a projecting member with a view thereof (A) showing a soluble retaining member holding back a loaded projecting member in an alternating pattern, a view thereof (B) showing the loaded projecting member in contact with cement slurry after the soluble retaining member is dissolved and immediately before projecting into the cement slurry, and a view thereof (C) showing the released projecting member.

In FIG. 7 and FIG. 8, features, units, and elements identified with like numbers can share like descriptions. FIG. 7 shows an illustration of an embodiment of a process for manufacturing a layered multi-material structural element. In FIG. 7a, a soluble retaining member 710 holds back a loaded projecting member 700 that is loaded with mechanical or elastic potential energy. The soluble retaining member 710 can be configured to completely or partially dissolve upon contact with cementitious material or cement slurry 720 such that, upon dissolution or weakening of the soluble retaining member 710, the loaded projecting member 700 projects into the cementitious material or cement slurry 720.

FIG. 7b shows the loaded projecting member 700 in contact with the cementitious material or cement slurry 720 after the soluble retaining member 710 has been dissolved and immediately before the loaded projecting member 700 projects into the cementitious material or cement slurry 720. FIG. 7c shows the loaded projecting member 700 after it projects into the cementitious material or cement slurry 720 to form a released projecting member 740. The loaded projecting member 700 can project into the cementitious material or cement slurry 720 by various mechanical motions, or combinations of mechanical motions, such as jutting, protruding, expanding, unfolding, unrolling, uncoiling, springing, etc.

The soluble retaining member 720 can be dissolved by a variety of suitable mechanisms. For example, the soluble retaining member 720 can be made of a polymer that is sensitive to alkaline (i.e., pH greater than 7) conditions such as those found in cement slurry. Nonlimiting examples of alkaline-sensitive polymers include polyvinyl acetate polymer, polyvinyl alcohol, polylactic acid, and combinations of the same. Another example could include using a water-soluble polymer to make at least a portion of the soluble retaining member 720. In another embodiment, the soluble retaining member 720 can be made of a heat-sensitive polymer, and can be actuated by subjecting the soluble retaining member 720 to a thermal load. According to at least one embodiment, the soluble retaining member 720 is a layer of polymer. The layer can have a thickness that is sufficient to retain the loaded projecting member 710 but is thin enough to dissolve, or at least partially dissolve, before the cementitious material or cement slurry 750 cures so that the loaded projecting member 710 can be released and project into the cementitious material or cement slurry 750. In some embodiments, the soluble retaining member 720 includes a layer of polymer having a thickness that is between about 1 μm and 20 cm, alternately between about 1 μm and 10 cm, alternately between about 1 μm and about 3 cm, alternately between about 100 μm and 3 cm, alternately between about 500 μm and 3 cm, alternately between about 1 mm and about 3 cm.

The loaded projecting member 710 can be designed to project into the cementitious material or cement slurry 750 upon its release and before the cementitious material or cement slurry 750 has cured. According to at least one embodiment, the loaded projecting member 710 can be made using a polymer such as polyvinyl alcohol, polyvinyl acetate, polyvinylpyrrolidone, polylactic acid, liquid crystal elastomers, etc. According to at least one embodiment, the cementitious material or cement slurry 750 and the released projecting member 740 can form a suffused zone where they contact each other as described previously so that a multi-material structural element having controlled failure characteristics is obtained.

FIG. 8 shows an illustration of an embodiment of a process for manufacturing a layered multi-material structural element. In FIG. 8, a soluble retaining member 820 and an inert retaining member 830 are used to hold back a loaded projecting member 810 until cementitious material or cement slurry 850 is introduced and the soluble retaining member 820 is dissolved, releasing the loaded projecting member 810 so that it can project into the cementitious material or cement slurry 850. The soluble retaining member 820 is applied where projection of the loaded projecting member 810 into the cementitious material or cement slurry 850 is desired, and the inert retaining member 830 is applied wherever it is desirable to retain the loaded projecting member 820 after the cementitious material or cement slurry 850 is introduced.

In FIG. 8a, the loaded projecting member 810 is held back by soluble retaining member 820 and inert retaining member 830 immediately before soluble retaining member 820 is dissolved in the presence of cementitious material or cement slurry 850. FIG. 8b shows the loaded projecting member 810 immediately after the soluble retaining member 820 is dissolved and before projecting into the cementitious material or cement slurry 850. Here, the inert retaining member 830 remains in place, and continues to hold back portions of the loaded projecting member 810. In FIG. 8c, the loaded projecting member 810 is projected into the cementitious material or cement slurry 850 to form a released projecting member 840. According to at least one embodiment, the soluble retaining member 820 and inert retaining member 830 can be applied alternately.

The inert retaining member 830 can be made of any material suitable for retaining the loaded projecting member 840 in the presence of the cementitious material or cement slurry 850. According to at least one embodiment, the inert retaining member includes a polymer that is neither readily soluble in water, nor sensitive to alkaline conditions. That is, the polymer does not dissolve sufficiently to release the loaded projecting member 840 before the cementitious material or cement slurry 850 cures.

Suffused zones can be formed where the cementitious material or cement slurry 850 contacts the released projecting member 840, the inert retaining member 830, or both as described previously so that a multi-material structural element having controlled failure characteristics is obtained.

According to at least one embodiment, the multi-material structural elements of this disclosure can include one or more layers of conductive materials. The one or more layers of conductive materials can be used to improve to provide structural reinforcement and to sense changing load through the materials by a piezoresponse. Suitable conductive materials can include carbon fibers, polyaniline fibers, polythiophenes, carbon nanotubes, carbon nanofibers, or similar materials, and combinations of the same; as well as metals such as copper, zinc, aluminum, nickel-aluminum alloys, or similar materials, and combinations of the same. The conductive materials can be applied so that there is a continuous conductive path through the multi-material structural element. As the load on a given conductive material layer changes, conductivity through the conductive material layer also changes. The difference in conductivity through the conductive material layer can be measured and correlated with the changing load so that a load measurement can be obtained.

Figure 9:
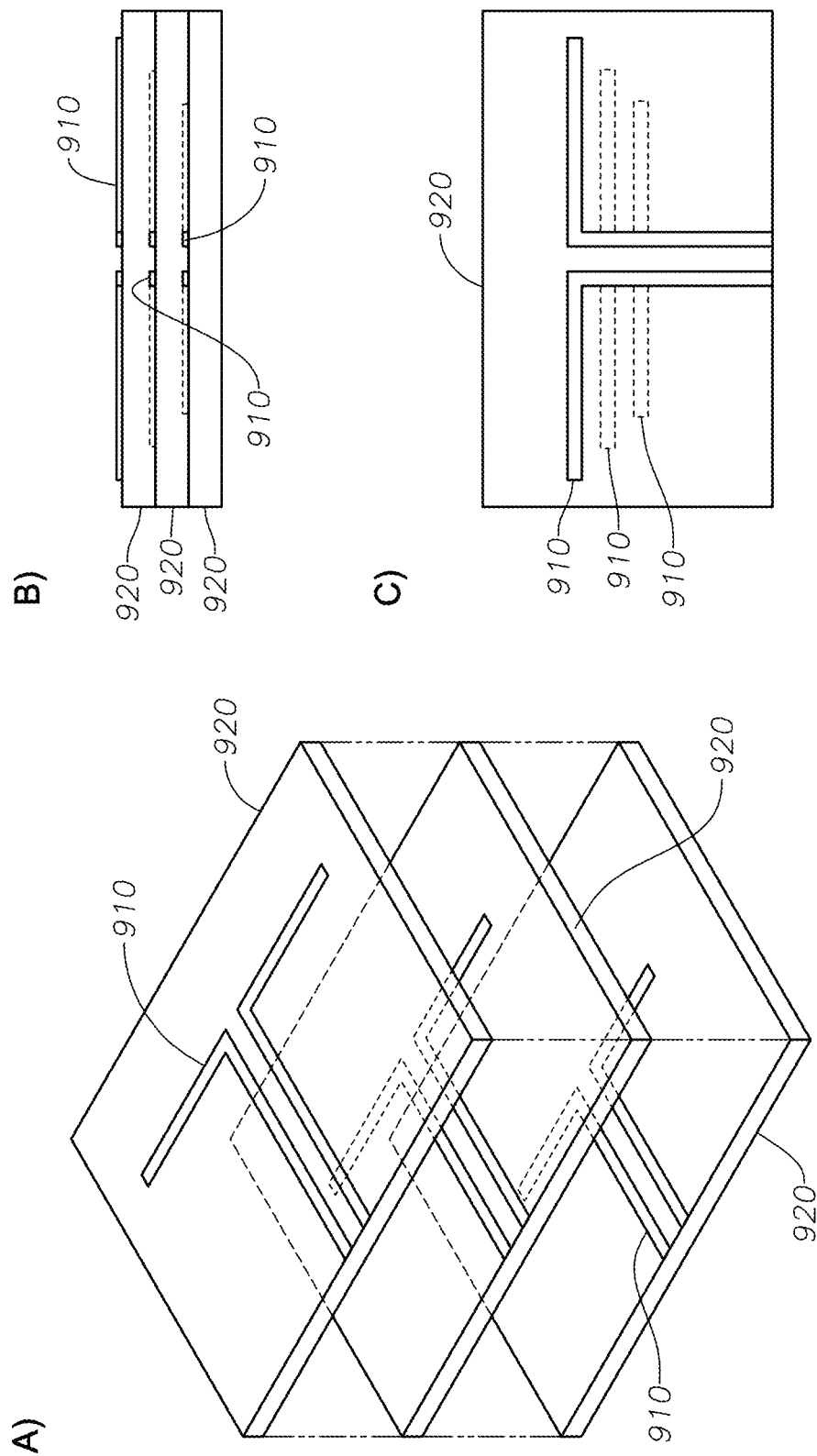
FIG. 9 shows an illustration of an antenna manufactured into a multi-material structural element including an expanded perspective view thereof (A), a front profile view thereof (B), and a top view thereof (C).

Efficient embedded antennas are needed to assist with wireless monitoring of structural integrity and identification of radio frequencies. According to at least one embodiment, alternating layers of conductive materials can be manufactured into the multi-material structural elements of this disclosure to be used as an antenna, electrical circuit, capacitor, or battery. Conducting materials can also be used in the multi-material structural elements of this disclosure to reduce the shielding effectiveness of the concrete or cement material in the multi-material structural element. Generally, cement structures do not enable good propagation of wireless signals within, and in and out of the structures. Poor propagation of wireless signals affects antennas in air as well as antennas embedded in the structures. To address this problem, nanomaterials can be dispersed in the printed cement along with the design of embedded antenna. Nanomaterials such as those used to make an antenna can be mixed into the cement material or cement slurry. Alternatively, an antenna can be printed in using a material that includes a polymeric substance with the nanomaterial blended in as a conductive filler. FIG. 9 shows an illustration of an antenna 910 manufactured into a multi-material structural element 920. According to at least one embodiment, the antenna can be manufactured into the multi-material structural element using the process shown and described in FIG. 8. The antenna can have a resonance frequency between about 1 kilohertz (kHz) and 15 gigahertz (GHz), and can be manufactured into a cement layer or a polymer layer.

EXAMPLES

The following examples are included to demonstrate embodiments of the disclosure, and should be considered nonlimiting. The techniques and compositions disclosed in the examples which follow represent techniques and compositions discovered to function well in the practice of the disclosure, and thus can be considered to constitute modes for its practice. However, changes can be made to the embodiments disclosed in the examples without departing from the spirit and scope of the disclosure.

Example 1— Making a Layered Multi-Material Structural Element Having Controlled Failure Characteristics An example of a process of making a layered multi-material structural element is provided. Alternating layers of polyvinyl alcohol and Portland cement were manufactured using direct ink writing additive manufacturing technology; each polyvinyl alcohol layer having a uniform thickness of 0.5 mm and each layer of cement being formed by four deposited layers of cement having uniform thickness of 0.5 mm each for a total thickness of 2 mm. Class G Portland cement was used as the cement material, and each layer was printed at 30 minutes per layer. Suffused zones were formed in the cement and polymer layers as the structural element cured in the absence of an external stimulus. The suffused zone was realized thermally using ambient heat, or the heat of hydration of the cement slurry as it set, and was estimated to be 10 nm thick.

Example 2—Analysis of a Layered Multi-Material Structural Element Having Controlled Failure Characteristics The layered multi-material structural element prepared and described in Example 1 was analyzed and compared with a reference element. The reference element was prepared using direct ink writing additive manufacturing technology to successive layers of cement in the absence of a polymer. The cement used to prepare the reference element was the same type of cement used to prepare the layered multi-material structural element of Example 1. The reference element was allowed to cure for a period of time.

Figure 10:
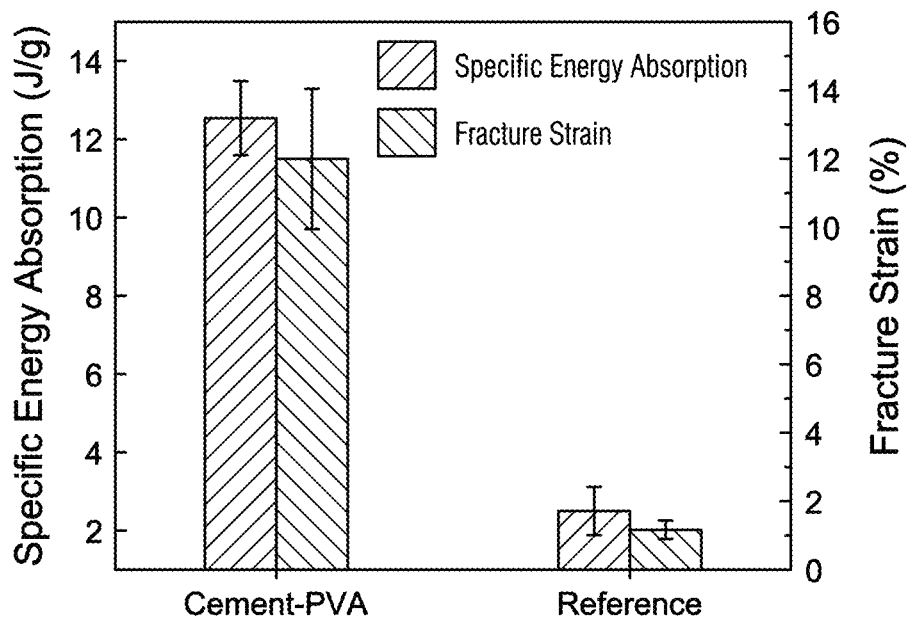
FIG. 10 is a plot showing a comparison of specific energy absorption and fracture strain of a layered structural element and a reference element.

The layered multi-material structural element and the reference element were each subjected to a uniaxial compressive load to observe the quasi-static mechanical characteristics of the samples. The specific energy absorption was calculated from measurements of the mass and energy absorption of each sample. Fracture strain and compressive strain measurements were also recorded, and photographs were taken as the compressive load increased. FIG. 10 shows a plot of the specific energy absorption with units of joules per gram (J/g) and fracture strain as a percentage ($\varepsilon_f$ %) for each sample. The results show that the layered multi-material structural element had significantly greater energy absorption and fracture strain than the reference element. The fracture strain of the layered multi-material structural element was about 12%, which is significantly greater than the fracture strain of the reference element (i.e., 1.2%). These improvements can be attributed to the layers of polymer and suffused zones in the structural element. The fracture surface revealed that the irregular morphology of cement was interlocked with a conformal polymer reinforcement in the interface region. Also, the soft polymer layer diverted the crack, resulting in higher fracture strain. A crack originating from the center of the structural element appeared to diverge as it neared the surface polymer.

Figure 11:
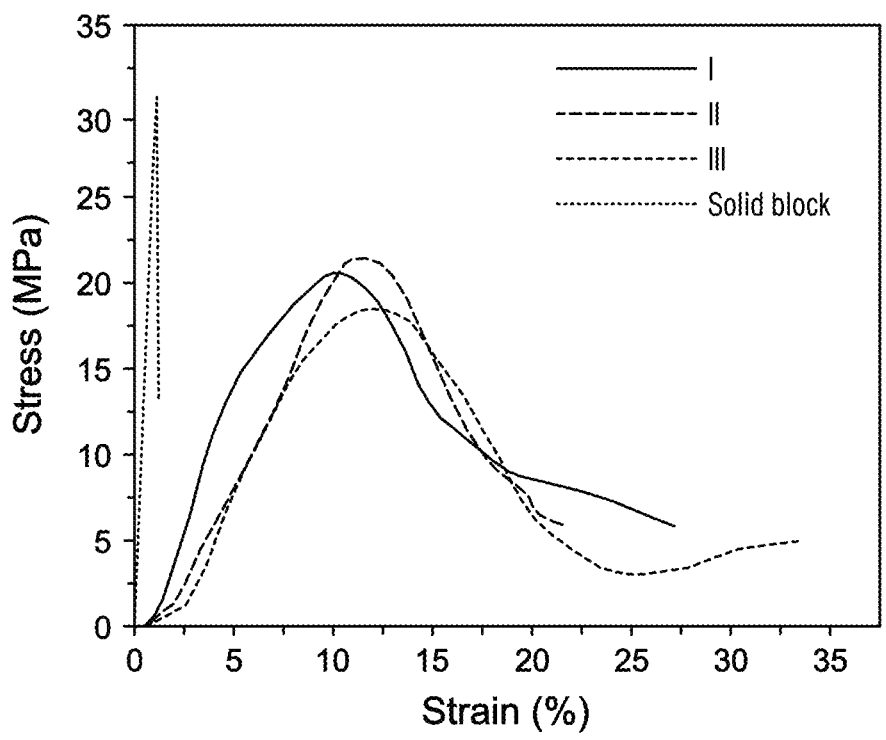
FIG. 11 is a plot and comparison of compressive stress and compressive strain until failure for three structural elements having controlled failure characteristics, and a reference element.

FIG. 11 shows a plot of compressive stress in megapascals (MPa) as a function of compressive strain as a percentage (ε %). For FIG. 11, four tests were carried out: three using three identical layered multi-material structural elements prepared according to the process described in Example 1, and one using a reference element prepared as described above. Although the yield stress of the reference element was greater than the yield stress of the three layered multi-material structural elements, the reference element failed with significantly less strain. On the other hand, the layered multi-material structural elements were able to achieve about ten times greater strain before they began to fail.

Figure 12:
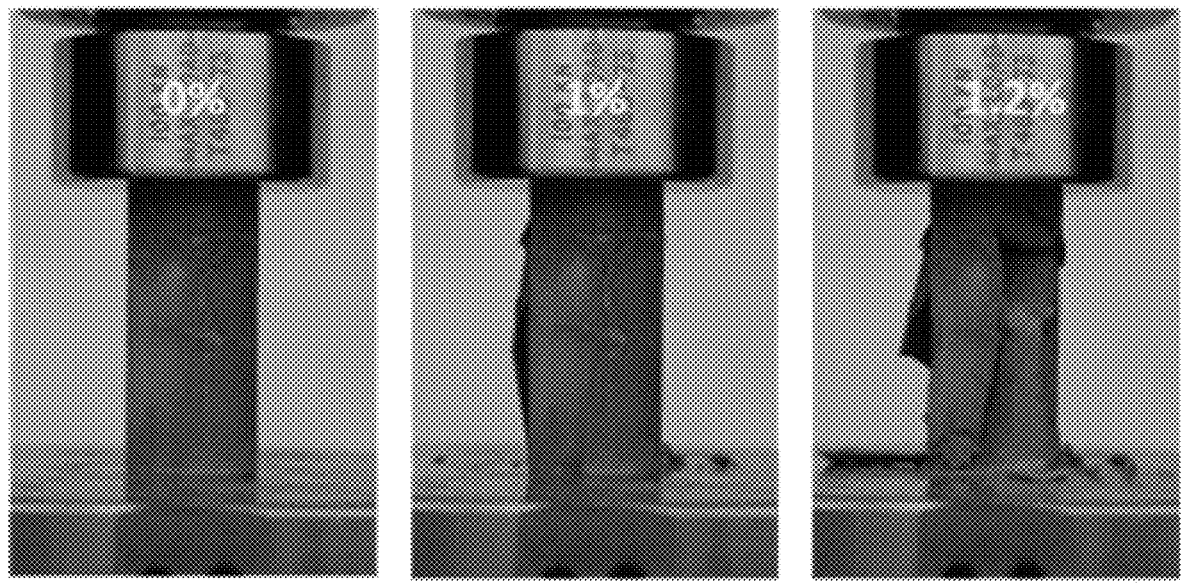
FIG. 12 shows images of fracture propagation and catastrophic failure in a cement block under a uniaxial compressive load.
Figure 13:
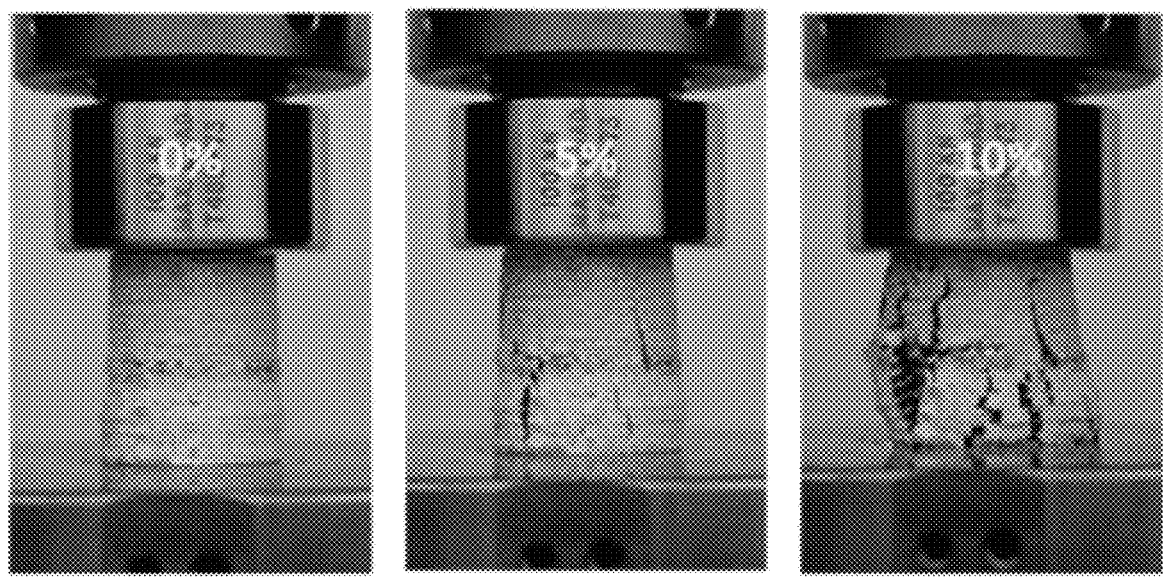
FIG. 13 shows images of fracture propagation and catastrophic failure in an embodiment of a layered structural element having controlled failure characteristics under a uniaxial compressive load.

FIG. 12 and FIG. 13 shows photographs of the reference element and the layered multi-material structural element, respectively under uniaxial compressive stress. The figures show deformation in the two samples. In FIG. 12, photographs taken at 0 ε %, 1 ε %, and 1.2 ε % are shown in 12A, 12B, and 12C, respectively. In FIG. 13, photographs taken at 0 ε %, 5 ε %, and 10 ε % are shown in 13A, 13B, and 13C, respectively. As shown in FIG. 12, the reference element failed at low strain. The photographs show that cracks initiated and propagated throughout the structure almost instantly, resulting in catastrophic failure. On the other hand, FIG. 13 shows that cracks in the layered multi-material structural element were successfully impeded so that the structural element was able to sustain greater strain and fail more gradually.

Figure 14:
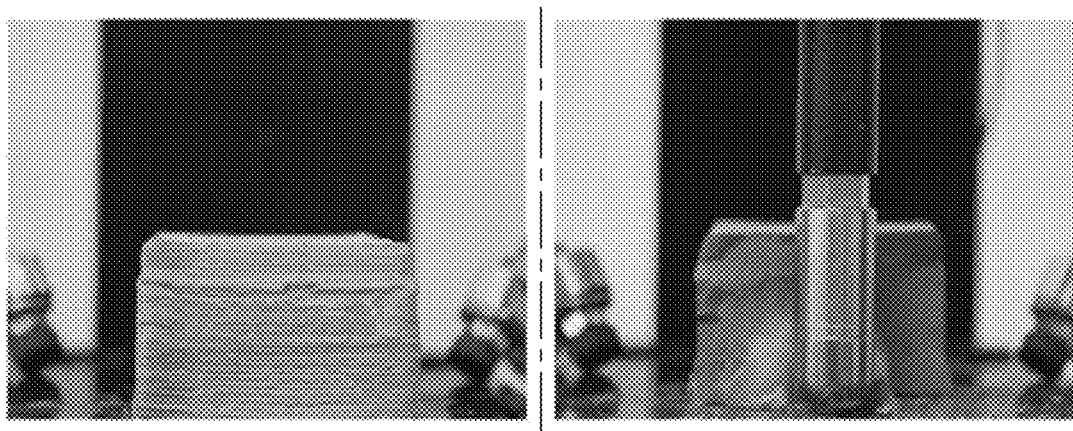
FIG. 14 shows images of a low-velocity impact test on a cement structural element formed without polymer layers and in the absence of a suffused zone.
Figure 15:
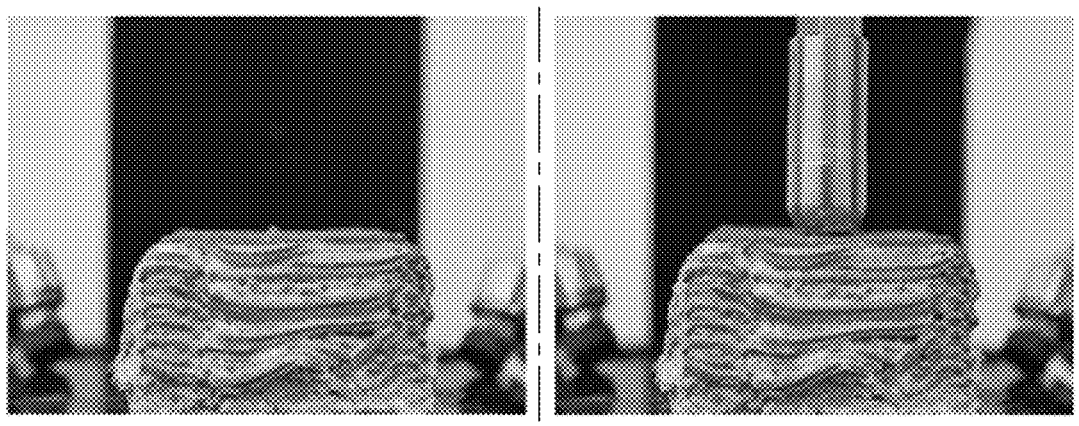
FIG. 15 shows images of a low-velocity impact test on a layered multi-material structural element having polymer layers and suffused zones.

A low-velocity impact test was carried out using a layered multi-material structural element as prepared in Example 1 and a reference element prepared using the same method described previously. The samples were subjected to force from an impact resulting from a hemispherical impactor having the same weight dropped from the same height. Photographs of the samples were taken before and after the impact, and deformation of the samples was compared. FIG. 14 shows before and after impact photographs of the reference element, and FIG. 15 shows before and after impact photographs of the layered multi-material structural element. As shown in FIG. 14, the impact broke the reference element resulting in catastrophic failure. On the other hand, FIG. 15 shows that the impactor was unable to penetrate the layered multi-material structural element. It appears that the layers of polyvinyl-alcohol and the suffused zones in the cement layers successfully impeded crack propagation preventing failure of the structural element. The damage progression was delocalized by the crack arrest in the suffused zones, resulting in higher impact energy dissipation within the materials and enhancing their overall toughness.

Example 3—Making a Layered Multi-Material Structural Element Having a Schwarzite Structure and Controlled Mechanical Failure Characteristics An example is provided for making a structural element having a Schwarzite structure and controlled mechanical characteristics. A one-piece sacrificial mold was printed by fused deposition modeling using polyvinyl alcohol and a printer having a resolution of about 10 μm in the x-y Cartesian plane, and about 20 μm in the direction of the Cartesian z-axis. The one-piece sacrificial mold had a negative geometric contour that defined a positive geometric void in the shape of a primitive Schwarzite structure having two rows and two columns of repeating unit shapes. A cement slurry was prepared using Portland cement, and poured into the one-piece sacrificial mold to fill the positive geometric void and obtain a cement-mold composite. A vacuum pump was used to create suction a lower portion of the one-piece sacrificial mold as it was filled to assist with evenly distributing the cement slurry and filling voids. The cement slurry was allowed to cure at room temperature for about three days.

After curing, the cement-mold composite was washed with water to remove a portion of the one-piece sacrificial mold, leaving a thin layer (between about 10 μm and about 1,000 μm thick) of polymer from the one-piece sacrificial mold adhered to the cement shape, and then dried in a vacuum oven for a period of time. The thin layer of polymer adhered to the cement shape was found to be fused with the cement matrix. Washing with hot water (about 70° C.), and annealing at about 90° C. had no discernible effect on the thin layer of polymer.

Figure 16:
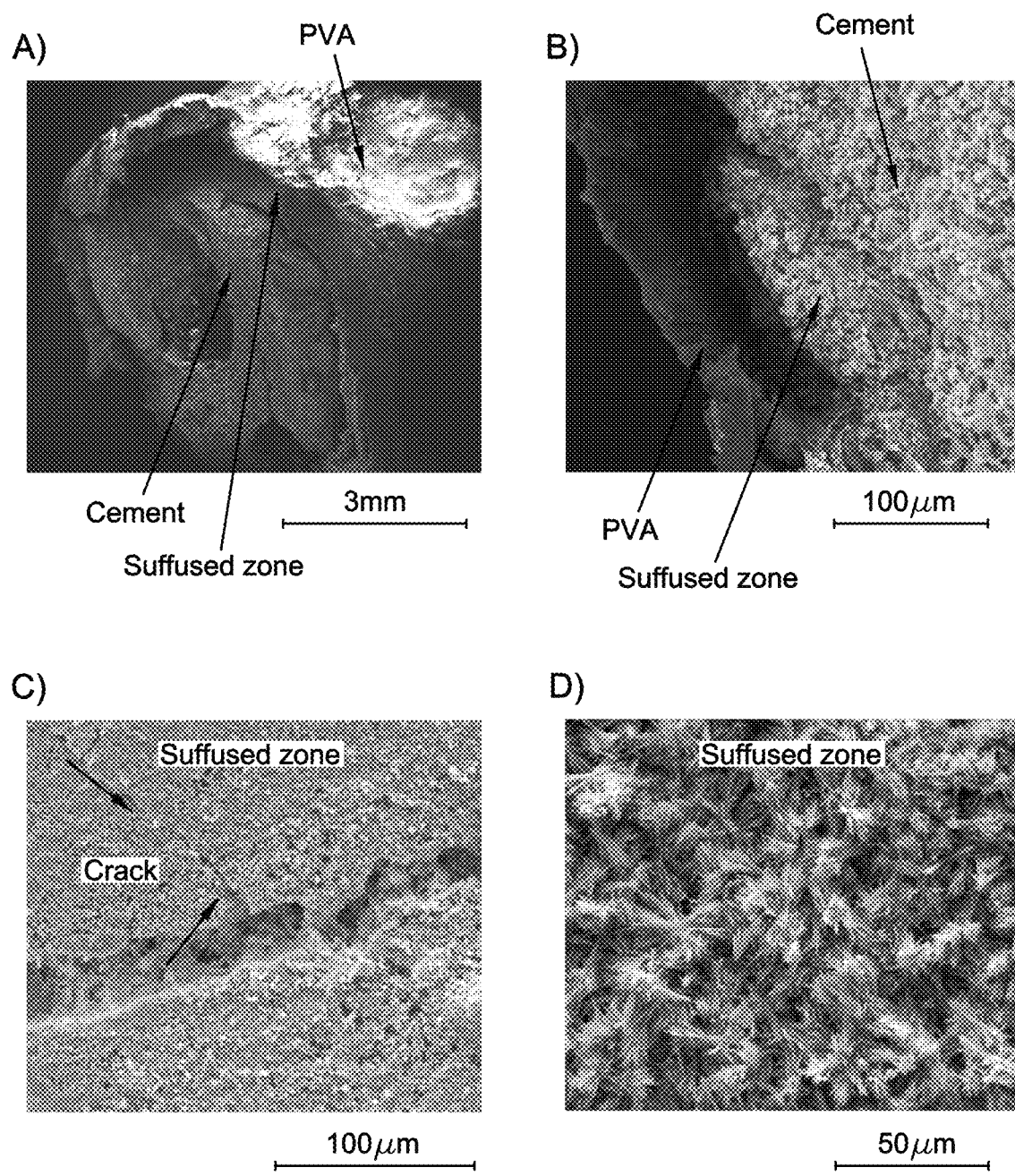
FIG. 16 shows scanning electron images of a surface of a layered multi-material structural element at various degrees of magnification.

Example 4—Analysis of a Structural Element Having Controlled Mechanical Failure Characteristics FIG. 16 shows scanning electron images of a surface of a layered multi-material structural element at various degrees of magnification. FIG. 16a shows the fracture surface of a Schwarzite structure having a layer of polyvinyl alcohol, a cement layer, and a suffused zone (interface). FIG. 16b shows the topography of the three regions in the fracture surface of the Schwarzite structure. FIG. 16c shows a magnified view of the fracture surface in the suffused zone, which shows that the suffused zone arrested the crack and prevented crack propagation. FIG. 16d shows the combination of polymer and cement in the suffused zone.

Figure 17:
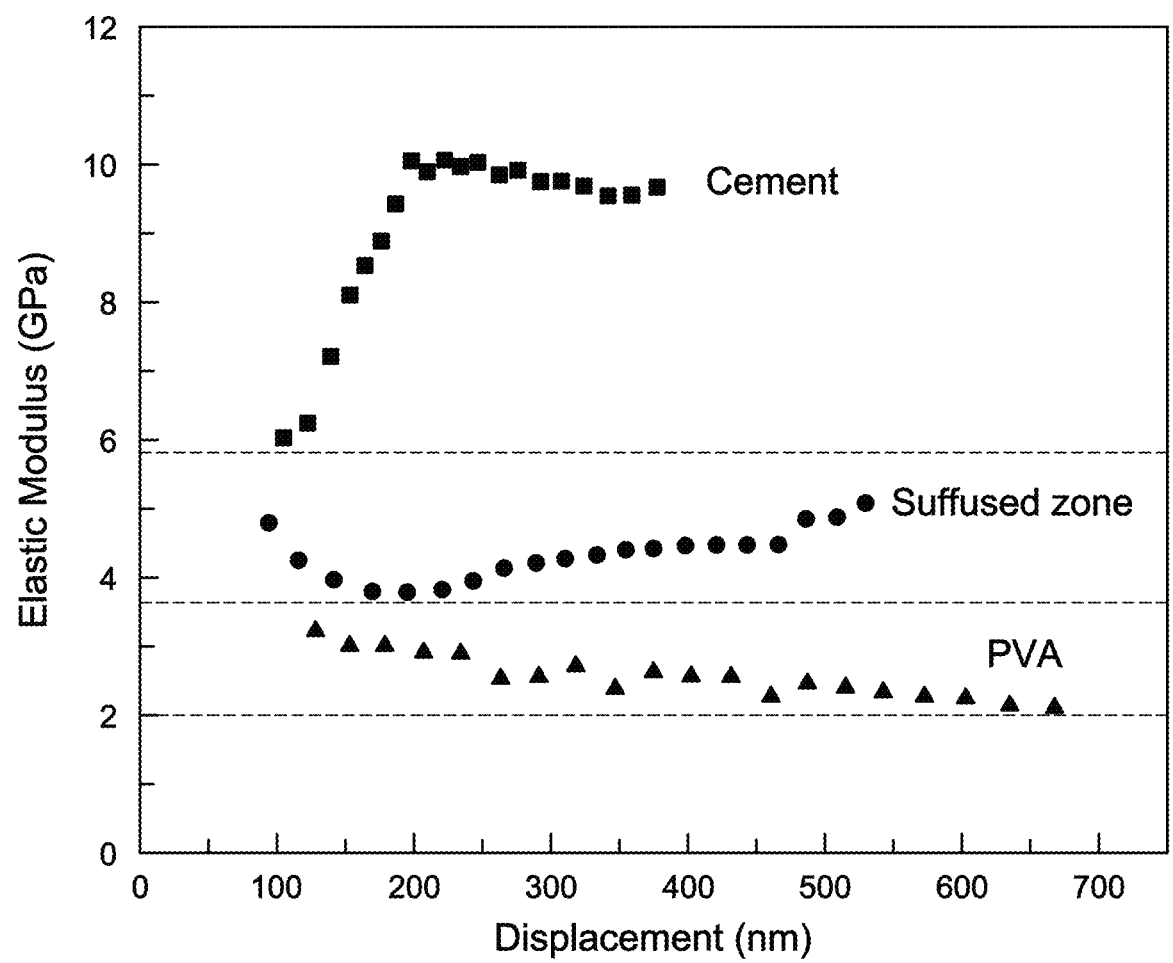
FIG. 17 shows a plot of elastic modulus as a function of displacement for microscopic regions of a Schwarzite structure.

In order to correlate the macroscopic deformation in the structural element with mechanical properties of the microscopic regions, nanoindentation studies on the developed Schwarzite structure were carried out. FIG. 17 shows a plot of elastic modulus as a function of displacement for the microscopic regions of the Schwarzite structure. The analysis was done at three different points: (i) the PVA-rich outer core, (ii) suffused zone, and (iii) the inner cement matrix. The nano-indentation mapping over each region suggested significantly different micromechanical properties. The observation suggested that the outer core (the PVA microfiber matrix) had a modulus value of around 3 GPa, and the inner cement matrix had a modulus value of approximately 11 GPa. The suffused zone had a modulus value of about 6 GPa. The suffused zone had an improved modulus value that can be attributed to chemical interactions between the polymer and the cement.

The structural element prepared and described in Example 3 was analyzed and compared with a structural element having a honeycomb structure and a reference element (i.e., cement block). The reference element and structural element having a honeycomb structure were prepared from the same Portland cement slurry used in Example 3. The cement block sample was prepared using conventional casting techniques, and the structural element having a honeycomb structure was cast using the techniques described in Example 3; only the negative geometric contour and positive geometric void of the sacrificial mold, and the resulting cement shape, had a honeycomb geometric shape.

Figure 18:
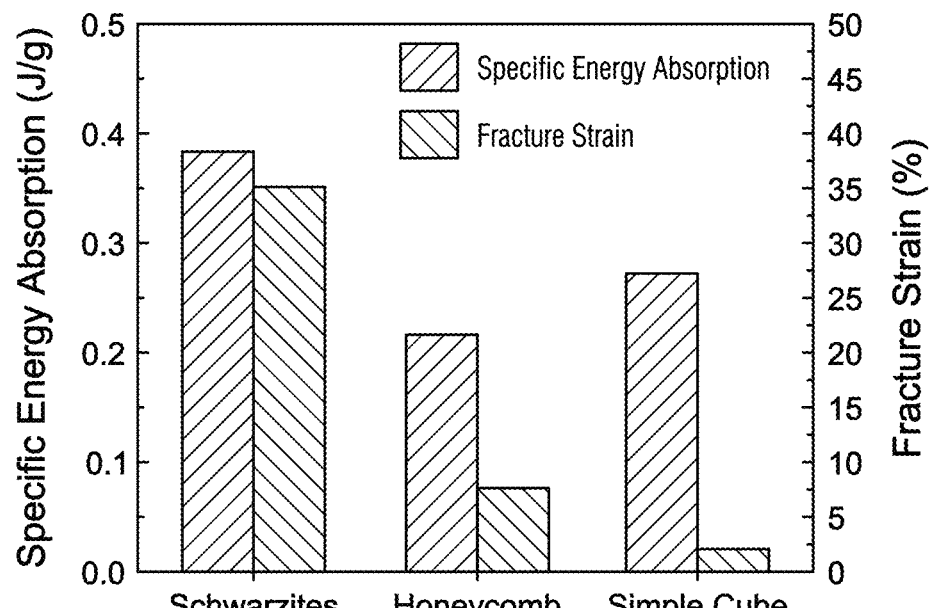
FIG. 18 is a plot showing a comparison of specific energy absorption and fracture strain of a structural element having a primitive Schwarzite geometric shape, a honeycomb cement structure, and a cement block.
Figure 19:
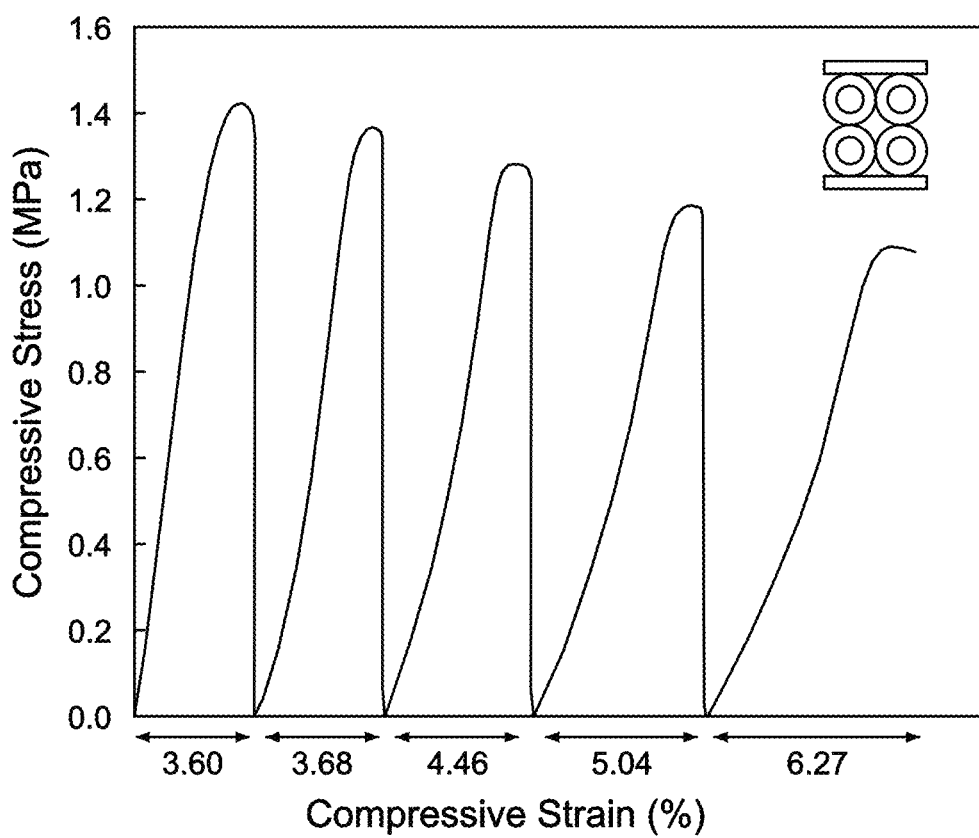
FIG. 19 shows a plot of compressive stress and compressive strain of a structural element having a primitive Schwarzite geometric shape.

The three samples were subjected to a uniaxial compressive load, and the specific energy absorption was calculated from measurements of the mass and energy absorption of each sample. Fracture strain and compressive strain measurements were also recorded, and photographs were taken as the compressive load increased. FIG. 18 shows a graph of the specific energy absorption with units of joules per gram (J/g) and fracture strain as a percentage ($\varepsilon_f$ %) for each sample. FIG. 19 shows a plot of compressive stress in megapascals (MPa) as a function of compressive strain as a percentage ($\varepsilon$ %) for the structural element prepared in Example 3.

As shown in FIG. 18, the structural element prepared in Example 3 had the greatest specific energy absorption of the three samples, which can be attributed to its Schwarzite structure. Both the structural element prepared in Example 3, and the structural element having a honeycomb structure demonstrated greater fracture strain than the cement block sample; suggesting that the fracture strain was significantly increased by the geometric shape of the structural elements combined with the presence of a polymer layer on the surface of the structural elements. Notably, the fracture strain of the structural element having the Schwarzite structure was about seventeen times greater than the fracture strain of the cement block sample.

Figure 20:
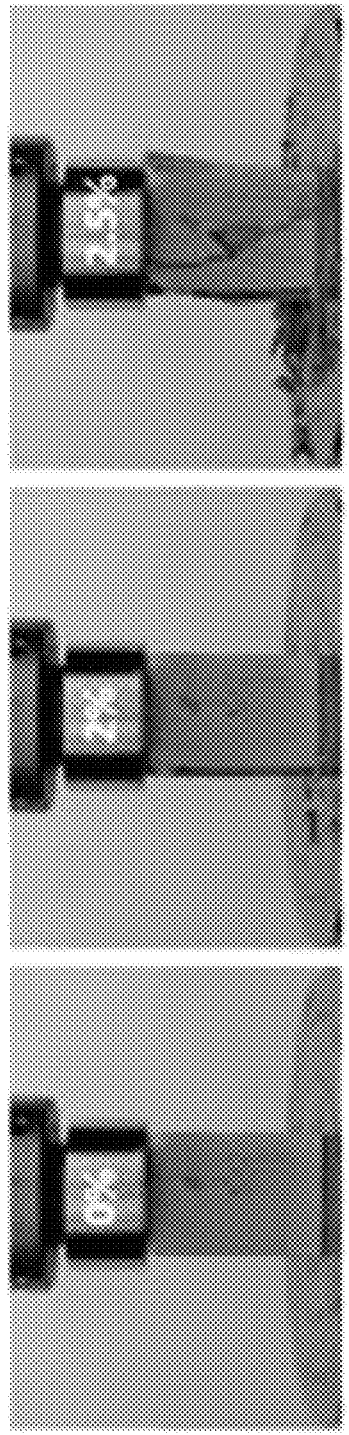
FIG. 20 shows images of fracture propagation and catastrophic failure in a cement block under a uniaxial compressive load.
Figure 21:
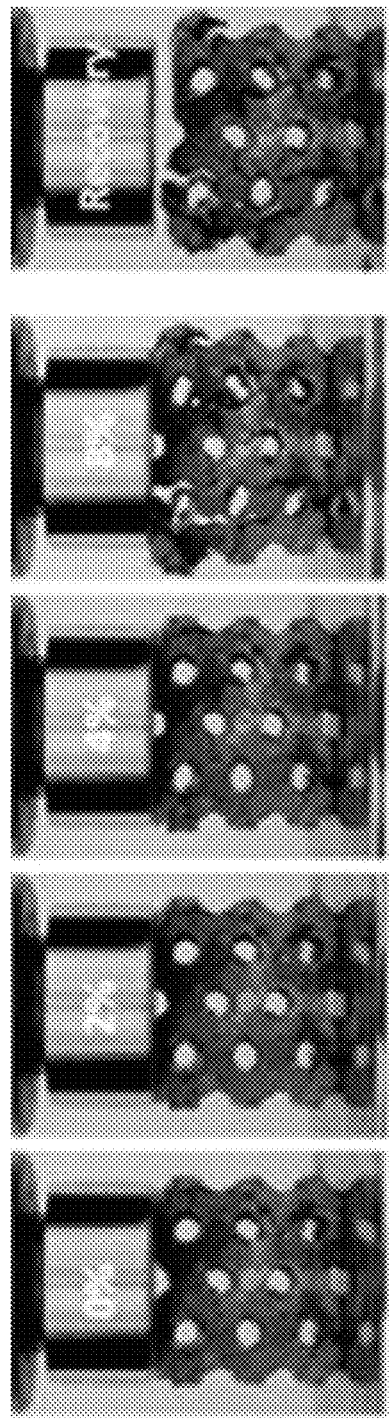
FIG. 21 shows images of fracture propagation and catastrophic failure in a honeycomb cement structure under a uniaxial compressive load.
Figure 22:
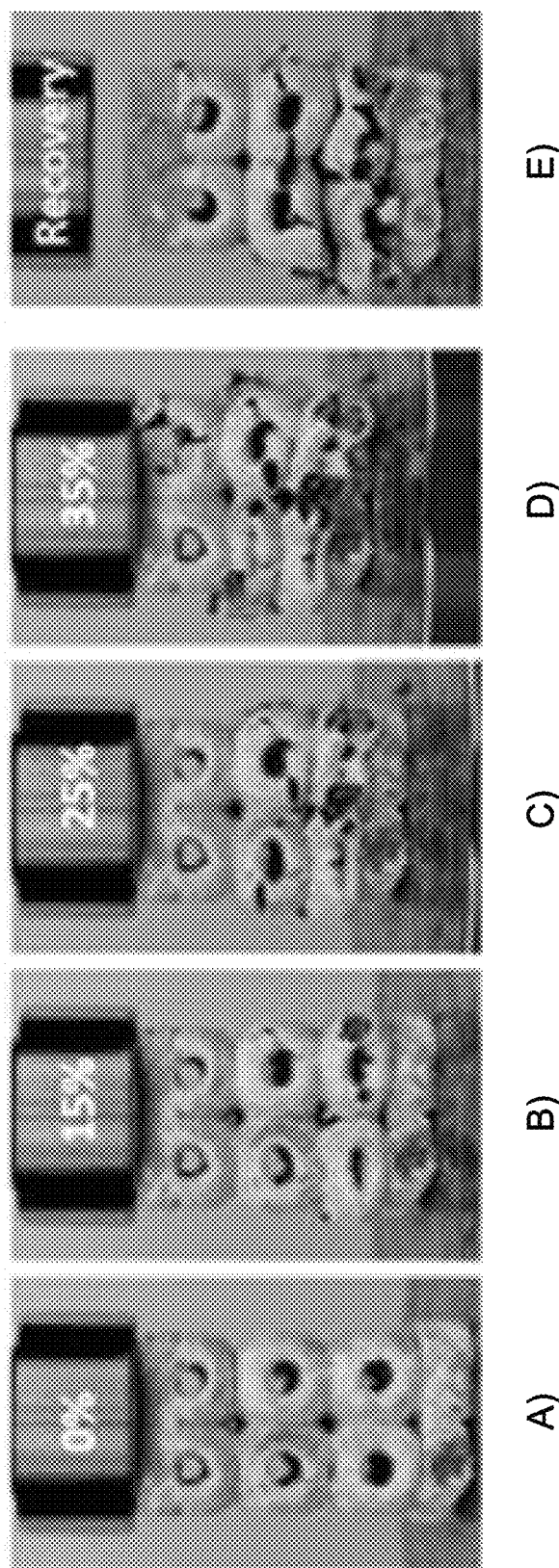
FIG. 22 shows images of fracture propagation and catastrophic failure in a cement structural element having a primitive Schwarzite geometric shape under a uniaxial compressive load.

Photographs showing the cement block sample, structural element having a honeycomb structure, and the structural element having a Schwarzite structure under uniaxial compressive stress are shown in FIG. 20, FIG. 21, and FIG. 22 respectively. In FIG. 20A-20C, the cement block sample is shown at 0, 2, and 2.5 $\varepsilon$ %, respectively. In FIG. 21A-21D, the structural element having a honeycomb structure is shown at 0, 2, 4, and 8 $\varepsilon$ %, respectively; and FIG. 21E shows the structural element in recovery. In FIG. 22A-22D, the structural element having a Schwarzite structure is shown at 0, 15, 25, and 35 $\varepsilon$ %, respectively; and FIG. 22E shows the structural element in recovery.

In FIG. 20, the cement block sample shows abrupt and random fracture propagation typical of conventional structural elements. The random fracture propagation shown in FIG. 20 can be attributed to the isotropic nature of the sample, which leads to stress localization and catastrophic failure. Macro-scale fractures appear in the cement block sample at about 2 $\varepsilon$ %, as shown in FIG. 20B, and quickly propagate through the sample until the sample fails completely at about 2.5 $\varepsilon$ %.

In FIG. 21, the structural element having a honeycomb structure shows moderate mechanical damping characteristics, however, fracture propagation appears to be random and sudden similar to the cement block sample.

The structural element of FIG. 22, on the other hand, demonstrates controlled failure and damping characteristics. As shown in FIG. 22B, fractures appear in the structural element's lower rows at about 15 $\varepsilon$ %. Not intending to be limited by theory, it is believed that the failure of the structural element is controlled because the Schwarzite structure causes fractures to be arrested locally, rather than propagating throughout the structural element. The failure of the structural element progresses gradually until about 35 $\varepsilon$ %, when the structural element's upper rows fail. The structural element recovers moderately after the compressive load is removed.

Notably, both the structural element having a Schwarzite structure and the structural element having a honeycomb structure achieved greater strain than the cement block sample (that is, about 35, 8, and 2.5 $\varepsilon$ % respectively).

Example 5—Making a Layered Multi-Material Structural Element Having Multifunctionality to Achieve Different Functional Characteristics A multi-material structural element made of cement and graphite, and having a built-in antenna, was developed by depositing layer-by-layer using additive manufacturing. The direct ink writing (DIW) technique was used to print conductive ink (graphite) between cement layers as shown in FIG. 9. Each layer of the structure had a thickness of 0.5 mm. One layer of graphite was printed with a specific pattern between every 10 layers of cement. Graphite ink with high electrical conductivity was used to print different-sized dipole antennas between cement layers to receive different frequencies. Through this method, different types of antennas with different shapes and geometry can be designed and printed between cement layers. The resistance of the three-dimensional printed graphite was 0.15 $\Omega\cdot$cm, which is measured with a four-point probe resistivity measurement.

We claim:

1. A layered structural element having improved mechanical properties, comprising:
    a cured cement shape, wherein the cured cement shape comprises cement;
    a polymer layer adhered to the cured cement shape, wherein the polymer layer comprises a polymer comprising a liquid crystal elastomer;
    a suffused zone, wherein the suffused zone comprises the polymer of the polymer layer suffused into the cement of the cured cement shape; and
    a geometric shape that comprises a schwarzite structure.

2. The structural element of claim 1, wherein the structural element has controlled mechanical failure characteristics.

3. The structural element of claim 1, wherein the polymer layer has a uniform thickness between 10 and 1,000 micrometers.

* * * * *